United States Patent
Schmidt et al.

(10) Patent No.: US 7,545,523 B2
(45) Date of Patent: Jun. 9, 2009

(54) METHOD, EQUIPMENT SYSTEM AND COMPUTER PROGRAM SYSTEM FOR PROCESSING DOCUMENT DATA

(75) Inventors: Jörg Schmidt, München (DE); Rüdiger Siemens, Batschkastr (DE)

(73) Assignee: Oce Printing Systems GmbH, Poing (DE)

( * ) Notice: Subject to any disclaimer, the term of this patent is extended or adjusted under 35 U.S.C. 154(b) by 774 days.

(21) Appl. No.: 10/477,661

(22) PCT Filed: May 14, 2002

(86) PCT No.: PCT/EP02/05297

§ 371 (c)(1), (2), (4) Date: Feb. 19, 2004

(87) PCT Pub. No.: WO02/093354

PCT Pub. Date: Nov. 21, 2002

(65) Prior Publication Data

US 2004/0139115 A1   Jul. 15, 2004

(30) Foreign Application Priority Data

May 14, 2001   (DE)   ............... 101 23 378

(51) Int. Cl.
*G06K 15/00*   (2006.01)
*G06F 3/12*   (2006.01)

(52) U.S. Cl. ............ 358/1.14; 358/1.13; 358/1.15; 358/1.16; 358/1.18; 715/201

(58) Field of Classification Search ............ 358/1.1, 358/1.14, 1.15–1.18; 400/62, 76; 270/58.09; 709/16; 399/1, 8
See application file for complete search history.

(56) References Cited

U.S. PATENT DOCUMENTS 5,243,518 A * 9/1993 Holt et al. ............ 715/500
5,609,333 A * 3/1997 Mandel et al. ........... 270/58.09

(Continued)

FOREIGN PATENT DOCUMENTS

DE   692 30 653   8/2000

(Continued)

OTHER PUBLICATIONS

Das Druckerbuch Technik und Technologien der Oce-Drucksystene-English Translation.*

(Continued)

*Primary Examiner*—Twyler L Haskins
*Assistant Examiner*—Dennis Dicker
(74) *Attorney, Agent, or Firm*—Schiff Hardin LLP

(57) ABSTRACT

In a method and system for processing document data in a document processing system, document data are generated on a document generation computer. Document data are transmitted from the document generation computer to a document processing computer. Processed data are forwarded to a document output system. To optimize control of document output, in the processing computer control data are added to or removed from transmitted document data. A control buffer file for the added control data and a document buffer file for the document data are automatically formed and stored by a control device program running on the processing computer. The output system is monitored with the control data by a monitoring computer.

7 Claims, 18 Drawing Sheets

U.S. PATENT DOCUMENTS

| | | | | |
|---|---|---|---|---|
| 5,664,074 | A | * | 9/1997 | Kageyama et al. ......... 358/1.14 |
| 5,715,381 | A | | 2/1998 | Hamilton |
| 5,768,488 | A | * | 6/1998 | Stone et al. ................ 358/1.18 |
| 6,030,132 | A | * | 2/2000 | Harman et al. ................ 400/62 |
| 6,137,967 | A | | 10/2000 | Laussermair et al. |
| 6,266,150 | B1 | * | 7/2001 | Brossman et al. .......... 358/1.15 |
| 6,995,853 | B1 | * | 2/2006 | Bratsanos et al. .......... 358/1.15 |
| 2005/0261971 | A1 | * | 11/2005 | Iguchi et al. .................. 705/16 |

FOREIGN PATENT DOCUMENTS

| | | |
|---|---|---|
| DE | 100 34 841 | 3/2001 |
| DE | 696 11 649 | 6/2001 |
| EP | 0 697 648 | 2/1996 |
| WO | WO 00/49489 | 8/2000 |
| WO | WO 00/68877 | 11/2000 |
| WO | WO 01/77807 | 10/2001 |
| WO | WO 02/19182 | 3/2002 |

OTHER PUBLICATIONS

IBM Data Stream and Object Architectures.
Advanced Function Presentation—IBM Feb. 18, 1994.
Das Druckerbuch—Herausgeber u. Redaktion: Dr. Gerd Goldmann.
Océ Solutions and Partners—Das Druckerbuch.
Advanced Function Presentation Programming Guide and Line Data Reference.
IBM Print Service Facility-AFP Conversion and Indexing Facility: User's Guide.

* cited by examiner

| Anfrage | | | | | | | |
|---|---|---|---|---|---|---|---|
| Kundennummer ▼ | | 3454564 | | Suchzeitraum (von/bis) | | | Suchen |
| Kundennummer | | | | | | | |
| Rechnungsnummer | | | | | | | |

| Kundennummer | Datum | Job | Anfang | Ende | # | Sending | Man. | Display |
|---|---|---|---|---|---|---|---|---|
| 3454564 | 12.12.00 17:44 | TSNAACCC | 12.12.00 17:21 | 13.12.00 01:23 | 2 | 0000003 | ja | D2 Rechnungen |
| 3454564 | 13.12.00 06:45 | TSNBBXXX | 13.12.00 01:21 | 13.12.00 23:12 | 0 | 0012389 | nein | D2 Rechnungen |
| 3454564 | 13.12.00 16:15 | TSNXXGGG | 13.12.00 12:11 | 13.12.00 23:09 | 0 | 0039845 | nein | D2 Rechnungen |

195

METHOD, EQUIPMENT SYSTEM AND COMPUTER PROGRAM SYSTEM FOR PROCESSING DOCUMENT DATA

RELATED APPLICATIONS

The present application is related to another application of the same inventors filed on even date herewith: "METHOD, EQUIPMENT SYSTEM AND COMPUTER PROGRAM SYSTEM FOR PROCESSING DOCUMENT DATA", José La Rosa Ducato and Hartwig Schwier, inventors—Case No. P03,0458 and "METHOD, EQUIPMENT SYSTEM AND COMPUTER PROGRAM SYSTEM FOR PROCESSING DOCUMENT DATA", inventors Martin Silbersack and André Kouptchinsky—Case No. P03,0459.

BACKGROUND OF THE INVENTION

The invention concerns a method, a device system and a computer program system to process document data. In particular, it concerns a method and systems to process a print data stream that is prepared for output on an output device such as, for example, a print device or an electronic mailing system (email system). In electronic high-capacity printing systems, such a preparation typically occurs on computers that process the print files or print data from application programs such that they are adapted for the printer. The print data are thereby, for example, processed as an output data stream of a specific print data language such as AFP (Advanced Function Presentation), PCL (Printer Command Language) or PostScript.

In mainframe centers, print data are typically collected (spooling event) in a host computer (main frame), and print jobs (jobs) are generated from them that are adapted for output on high-capacity printing systems such that, in the production operation, the high-capacity printing systems can be temporally, optimally operated at full capacity. They can thereby largely be used in continuous operation.

Such high-capacity printing systems, with print speeds of approximately 40 DIN A 4 pages per minute up to over 1000 DIN A 4 pages per minute, are, for example, specified in the publication "Das Druckerbuch", published by Dr. Gerd Goldmann (Océ Printing Systems GmbH), edition 4C, October 1999, ISBN 3-000-00 1019-X. In chapter 12 (pages 12-1 through 12-18) of this publication, the print server system known under the same PRISMA PRO® is specified which serves in production printing environments to prepare print data streams.

In chapter 14 of the same book, a production monitoring and checking system is specified under the title "Océ Domain", in which a document production process is planned, monitored and controlled. The system checks the production of documents and thereby monitors whether the documents are correctly printed, and checks the print quality in the course of the further processing—for example in a cutting device, an envelope device, and/or a device for mailing—for correct processing. Given interruptions, the system automatically initiates the reprint of a replacement document and the elimination of the document processed incorrectly, such that a continuous process checking of the generation of the document in an electronic system, for example an application program on a computer, is ensured until the conclusion of the production process, for example via the provision of the document for mailing.

To control and monitor the document production event, in the system cited above a plurality of computer-controlled components, what are known as managers, are provided that administer various monitoring or control tasks in the document production event. In what is known as a system manager, operation data of the overall printing process or preprocessing and post-processing process are recorded. All routing information in the implementation of the document production job, for example the number, size and parameters of the jobs to be processed, their degree of completion and duration, are thereby determined, and the devices with which the jobs were processed are recorded.

Machine data of the document production system are registered with what is known as the device manager. Static machine data, such as, for example, the device identification, its serial number, version or control software, etc., are thereby entered once into a databank. Dynamic machine data that are continually recorded during the operation of the device, for example current device settings, error notifications and capacity data (counter readings, clock speeds and so forth), are thereby provided on an ongoing basis with a corresponding time stamp and likewise recorded in the databank. Using these data, device evaluations for individual devices or device groups can then occur, for example workload reports, error reports or capacity reports can be generated. Such data or reports can then be exported via an application program-specific interface (application program interface, API) into other systems suitable for evaluation.

A typical print data format in electronic production printing environments is the format AFP (Advanced Function Presentation), which, for example, is specified in the publication Nr. F-544-3884-01 by the company International Business Machines Corp. (IBM) with the title "AFP Programming Guide and Line Data Reference". In this publication, the specification for a further data stream with the designation "S/370 Line-Mode Data" is also specified. The print data stream AFP was further developed into the print data stream MO:DCA, which is specified in the IBM publication SC31-6802-04 with the title "Mixed Object Document Content Architecture Reference". Details of this data stream, in particular the use of structured fields, are specified in U.S. Pat. No. 5,768,488.

The program that was known under the designation ACIF, with which it is possible to index and to convert print data streams, was achieved by the company IBM. The ACIF application is specified in the IBM brochure G544-3824-00 with the title "Conversion and indexing facility application programming guide" as well as in the IBM brochure Nr. S544-5285-00 with the designation "AFP conversion and indexing facility (ACIF) user's guide".

In WO-A1-00/49489, a method to operate a print system under production conditions is specified in which a plurality of print devices and additional devices are coupled with control computers, and in which control information is exchanged between the devices and the computers.

In WO-A1-00/68877, a method and a system are specified with which print data are provided for printing in a logical sequence corresponding to a signature.

In WO 01/77807 A2 (Int. Anm. Nr. PCT/EP01/04556), a method and a device system are specified with which large print data streams (under the circumstances comprising multiple thousand print pages) are processed for an output with high speed under print production conditions. The print data streams are thereby converted into a normalized data format, the data subsequently indexed and resorted by means of the index thereby generated by means of predetermined parameters, such that they are adapted and/or optimized for speed with regard to their print sequence for subsequent processing steps.

Methods and systems are specified in WO 02/19182 with which a document production process can be implemented time-optimized in a high-speed printing system.

A monitoring system is specified in U.S. Pat. No. 6,137,967 A with which generated print stock is checked with regard to its integrity with the data provided for printing.

A document production and processing system for what are known as mail pieces (mail sales shipments) is known from U.S. Pat. No. 6,030,132 A.

A system to measure the stack height in a mailbox grain of a printer used mutually by a plurality of users is known from DE 696 11 649 T2.

Further document production and processing systems are known from U.S. Pat. No. 5,768,488 A, DE 692 30 653 T2, and U.S. Pat. No. 5,609,333 A.

The contents of all of the publications and patent applications cited above are hereby included by reference in the present specification.

SUMMARY OF THE INVENTION

It is an object of the invention to specify a method, a device system and a computer program system with which the processing of document data for output of the data to an output device is possible, in particular with high speed under production conditions.

In a method and system for processing document data and a document processing system that comprises at least one document generation computer, a document processing computer, an electronic document output system, and a monitoring computer, document data are generated on the document generation computer by use of a document generation module. The document data are transmitted from the document generation computer to the document processing computer and the data are processed there. The processed data are forwarded to the document output system for output of the documents. To optimize control of the document output, in the processing computer, a processing module at least one of adds control data to and removes control data from transmitted document data. The control buffer file for the added control data and a document buffer file for the document data are automatically formed and stored by a control service program running on the processing computer. The output system is monitored with the control data by the monitoring computer.

BRIEF DESCRIPTION OF THE DRAWINGS

FIG. 15 illustrates a display window to monitor print jobs and devices;

FIG. 18 illustrates a display menu for document search.

DESCRIPTION OF THE PREFERRED EMBODIMENT

Figure 1:
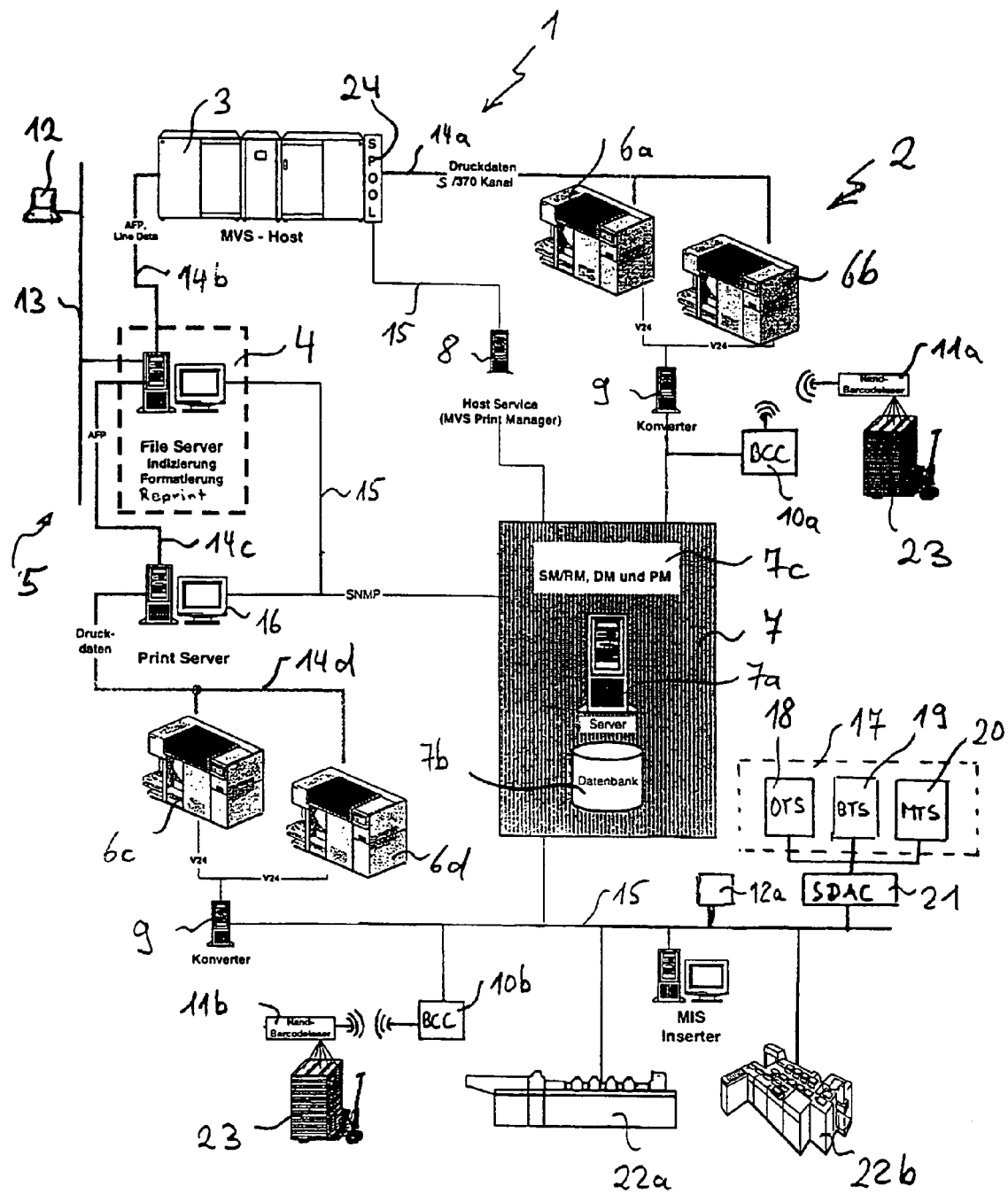
FIG. 1 illustrates a production system to print document data.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

According to a first aspect of the preferred embodiment, document data in a document processing system (that comprises at least one document generation computer, a document processing computer, an electronic document output system such as, for example, a print device or an e-mail system, as well as a monitoring computer) are produced by means of a document generation module on the document generation computer. The document data are then transmitted from the document generation computer to a processing computer and are there processed further. In the course of this further processing, control data are automatically added by means of a processing module to the transmitted document data, and the control data are additionally stored in a control data buffer file separate from the document data stream. The storage occurs in particular in the processing computer, however the file can also be transmitted and in particular copied, onto the monitoring computer.

The control data are in particular added to or associated with the document data in the processing computer, in particular range-by-range, and in the output with output printing stock or printed out in the course of a printing, at least range-by-range, on corresponding printing stock. Within a print job that can comprise multiple thousand pages, such range-by-range data can be associated with a predetermined range of the hierarchy, for example with a document that can comprise a plurality of pages, what is known as a mail piece, that comprises one or more documents, a sheet that comprises one or two pages, or also an individual page. These data ranges organized hierarchically in the document data stream or print job can be adapted to the respective production process via the additional control data and, given the control of the subsequent document output in a printing system with corresponding post-processing systems such as a cutting device, envelope devices etc., can in particular be at least logically connected for optimization of the overall process. The control data buffer file also serves in particular for this, which for this can be used to utilize the control data, for example barcodes, to generate a nominal list. The nominal list is in particular compared with monitoring data which are recorded in the post-processing processing stations (for example in the printer or in the inserter). The printed control data are thereby completely or semi-automatically read off from the respective print stock and transmitted to the monitoring device. This monitors the overall production process as to whether all documents, mail pieces and/or pages are output completely and error-free. This can go so far as that the delivery of the documents, whether transmitted in printed manner or in another manner, is recorded at an end customer a globe away by means of an electronic connection network.

In advantageous exemplary embodiments, in the processing computer further additional files (in particular an extraction file, also formed as an analysis file) are determined and stored that comprise data which were selectively determined from the print data stream by means of predetermined extraction rules, or also static data with regard to predetermined analysis parameters (such as, for example, total page number of a job).

Within a document output system that, for example, processes data in the AFP format, the processing occurs in a relatively advanced stage of the document processing, in that the complete data stream stands shortly before its output to an output system (e-mail dispatch system, printing system). The data processing events are in particular implemented directly before, after, or together with a sorting of the data stream according to a predetermined sorting sequence, for example according to postal codes, names and/or customer numbers.

According to a second aspect of the preferred embodiment, that can also be viewed as independent of the first aspect, in a document processing system that substantially comprises the same computer and devices as the document processing system of the first aspect, the document data are again transmitted from the document generation computer to a processing computer and are processed there. The data stream is also manipulated in the processing computer in this aspect of the invention; however, in this aspect, before the document output control data are largely automatically added to or removed from the document data stream by means of a processing module. The processing module thereby decides relatively independently whether control data that are comprised in the input document data stream are no longer necessary for the further processing, and therefore can be removed, and/or whether additional control data, in particular barcode data that, as in the first aspect, can serve for this to logically combine individual ranges within the document data stream, such that their further processing in the output system can be further processed with high performance (with greater speed and high processing security).

In the second aspect, in the processing computer a control buffer file whose content corresponds to the added control data, as well as a document buffer file in which the document data substantial for the output process (printing process) are comprised, are formed and stored by a control service program. The buffer files in particular enable the necessary new provisioning of the document data to be implemented with higher performance, given an error in the output system. As soon as it is established by the monitoring computer (using the control data available to it) that an error has occurred in the document output, it can give a confirmation to the processing computer that can immediately reproduce and newly supply to the output system (reprint) the corresponding document data using the stored control data and the document buffer file, without temporal delay.

According to the second aspect, in particular given the reduction of the print data stream by unnecessary control information, a data compaction or data compression can be achieved without influencing the print data relevant for the printing. For the further print process, unnecessary data can thus easily be filtered out and the data stream can thus be reduced by unnecessary data. On the other hand, the desired supplementation of control information, whose structure and/or content are adapted to the subsequent output process or to the requirements of the output devices participating therein, effects a further improvement of the production process. The inclusion of barcodes is in particular advantageous for the output of mail pieces that are assembled from various individual pages originating within the input data stream. This is then notably valid when the data stream is additionally resorted in the processing computer, such that the resorted data stream transmitted to the output system are likewise adapted to the output systems, for example in that various documents or, respectively, pages that should be merged into a mail piece are already supplied in the print data stream in successive sequence to the output system, and thus are printed out one directly after another.

According to a third aspect of the preferred embodiment, that likewise concerns a document processing system of the type cited above but that can be viewed as independent of both other previously cited aspects, in the processing computer control data are added to the document data, such that in the subsequent processing steps, in particular given the output of the document, the documents can be processed separately, segment by segment. Such data can, for example, be barcodes that in particular are respectively inserted at the beginning and at the end of the corresponding segment of the data stream. Again, pages, sheets, documents and mail pieces are suitable as segments. Additionally or alternatively, other segmentation criteria, such as, for example, a maximum number of total pages, can be selected. Via such a segment-by-segment processing in the output region, a batch processing can be achieved via which in particular large print jobs with multiple thousand pages are above all easier to process when these require a manual intermediate step. The segments can then be selected such that they do not exceed a specific foliation, whereby the segmentation in particular occurs fully automatically according to predetermined segmentation rules. For this, the processing computer comprises a processing module that examines the input document data and automatically inserts the corresponding control data, respectively at the beginning and at the end of the segment. The document data are hereby analyzed job by job with regard to their size, and a job is segmented into at least two partial jobs when it respectively exceeds a predetermined size. The batch data are inserted into the data stream over the beginning, the end and/or over the extent of the partial job. These can also be printed out and, in the later processing, in particular with automatic reading devices, be recorded from the printed documents both at the beginning of the segment and at the end of the segment. The specification of at least two of the segmentation data "beginning", "end", and "extent" then allows a sure reading and processing of the segments, even when the generated print stock are stacked on top of one another, and therefore only data from the uppermost document of the stack are recordable.

According to a preferred exemplary embodiment, a barcode reading device comprising a device (for example IR transmission or radio antenna) for a wireless data transmission to a control unit is provided as a data recording device that is connected via the control unit with the monitoring computer. Furthermore, it is thereby advantageous when the barcode reading device additionally comprises an input unit (keyboard, touch screen, display) via which control commands are directly transmittable from the hand barcode reader to the monitoring computer. The possibility thereby opens up that operating personnel that must effect manual workings with the printed materials can have controlling access to the monitoring computer via input of commands and, as the case may be, via this even to all of the components involved in the print production process, from document generation module to shipping machines.

According to a further aspect of the preferred embodiment, that likewise concerns a document processing system of the type cited above, and also can be viewed as independent of both other previously cited aspects, a document search system is specified with which documents are localizable, in particular in a print production system. For this, a central document service control is provided that records diverse control data generated in a production-technical manner, and which makes these data available for the document search, both centrally and also decentrally.

With the preferred embodiment, it is from now on possible in a print production line to document-precisely track and newly print reproductions (what are known as reprints) that, for example, are necessary due to incorrect printing or incorrect post-processing (wrong folding, wrong cutting, wrong enveloping, document damage, etc.). The fully automatic and system-spanning tracking of the reprint documents thereby occurs. Thus the specifications for reproduction jobs can be made available in all devices that have a direct or indirect connection to the central monitoring computer. This is in particular true for device that further process the documents after the printing. The documents are thereby electronically tracked by one of the connected computers, for example by the monitoring computer and/or by the processing computer.

A document print production system 1 is shown in FIG. 1 that, on the one hand, comprises a mainframe architecture 2, and on the other hand comprises a network architecture 5 in which respectively document data or document print data streams are generated by means of application programs (tools). In the mainframe architecture 2, these print data are generated by a host computer 3, in particular as an AFP print data stream or as a line print data stream. The print data can alternatively be directly transmitted via what is known as an S/370 channel 14a directly from the host computer 3 to one or more print devices 6a, 6b. Alternative to this output channel, the print data can also be transmitted via a network 13 or a direct data connection 14b from the host computer 3 to a processing computer 4, in which the print data are buffered (for example, in an associated file server) and processed for subsequent output steps. In such host computers 3, in particular print data streams are generated that assemble regular list printouts, bills, usage summaries (for telephone bills, gas bills, bank accounts) etc. from larger data stocks (databanks). Such applications have already frequently been in use for many years and are still necessary in a more or less unchanged manner (what are known as legacy applications).

The print production flow is monitored by a monitoring system within the mainframe architecture 2. It comprises a monitoring computer 7 that is coupled with a databank 7b and comprises various computer program modules 7c (compare FIG. 2).

The monitoring system is connected via a device control network 15 and a print manager module 8 with the host computer 3, as well as via a converter 9 with a V24 data line that connects to both print devices 6a, 6b. The converter 9 converts the V24 signals into DMI protocol signals of the device control network 15. SNMP protocol signals can be provided to the device manager DM converted as a DMI protocol signals or can be directly transferred as SNMP protocol signals.

Print stock 23 that was generated in the printers 6a, 6b from the document print data stream and on which barcodes are printed can be scanned with a manually movable, radio-controlled barcode reader 11a. The signals are transmitted via radio to the reading station 10a and transmitted on the device control network 15 or to the monitoring system 7. Readers for one-dimensional and/or two-dimensional barcodes can be used as barcode readers, such that various barcode systems can be read with one and the same reading devices. The barcode reading system is in particular configurable, meaning applicable to various application-specific check methods or, respectively, the respectively suitable check methods.

In the network architecture 5, document data are generated by means of application programs on client computers 12, 12a that are connected among one another via a client network 13, as well as with the processing computer (file server) 4. The file server serves as a central processing and treatment interface for print data of the entire print production system 1. Diverse control modules (software programs) run on it, via which the entire print production flow or the entire document processing is optimally adapted (in terms of application specifications, technical production, and device control) to the respective conditions.

In the processing computer 4, in particular the following functions are implemented that are more precisely specified in connection with the subsequent figures:

1. Converting Indexing Sorting

In this function, input print data are converted to a uniform data format, indexed according to predetermined parameters, and resorted in a predetermined sorting sequence. This enables, in particular for the subsequent document output, optimized resorting of the data stream, for example the merging of various pages that do not follow in sequence in the input data stream, such that, for example, they can be enveloped in an enveloping device 22b together with a letter mailing.

2. Inclusion of Control Information

In this function, control information, in particular barcodes, are introduced into the data stream, using which a belonging data group (for example page, sheet, document, mail piece) is recognizable as such and can be distinctly localized on the various processing stations in the production process.

3. Data Reduction

With this function, control data that were supplied in the input data stream from the host computer 3 or, respectively, application computer 12 to the processing computer 4 can be filtered to the effect that such control data that are unnecessary in the given overall system arrangement are removed. Via the connection of all involved output devices (printers 6a through 6d, cutting device (cutter) 22a, enveloping device 22b) via the device control network 15, it can already be decided in the processing computer 4 which control data of the input data stream is required by none of the connected devices. Via removal of this data from the data stream, the data stream can be reduced overall, in particular when only empty field entries for corresponding control data are comprised in the input data stream.

4. Extraction

With this function, predetermined data can be filtered or eliminated from the output data stream, whereby a compressed data stream (compacted data) occurs, in particular for control and status data that can be exchanged with very high speed between the participating devices and the monitoring computer. It is hereby possible to implement the monitoring of the participating devices in real-time.

5. Duplicate Printing (Reprint)

When, in the course of a further processing of the data, in particular given the output of the data to one of the print devices 6a, 6b, 6c or 6d, to one of the post-processing devices 22a, 22b or also to the print server 16, an error occurs, this can be determined via the monitoring system 7 using the control barcodes inserted in the processing computer 4, and the reprint of the documents (pages, sheets, mail pieces) affected by the disruption can be requested. This duplicate printing request is significantly controlled in the processing computer 4.

Print data that were completed by the processing computer 4 are supplied via the print data line 14c to the print server 16. Its task is then, for the most part, to relieve the processing computer 4. This occurs via buffer storage of the completed print data until their recall via the data line 14d to one or both printers 6c, 6d. The print server 16 is thus integrated into the overall system, primarily for reasons of performance. Given systems whose print speed is less great, the print server 16 can also be foregone.

Document data that are transmitted to the printers 6c or 6b, and are there printed on a recording medium (for example paper), are subjected in the overall system to further processing stages, namely the further processing of the cutter 22a and the enveloping device 22b. The print production process is thus finished.

The printed documents are tested with regard to various criteria on their processing path between the respective print devices 6a, 6b, 6c or 6d and the last post-processing device 22b, namely via an optical test system 18 with regard to their optical print quality, with a barcode test system 19 with regard to their existence, their consistency and/or their sequence, as well as with an MICR test system, insofar as the print was printed by means of magnetically readable toner (magnetic ink character recognition toner). The data of the various test systems supplied by the measurement system 17 are transmitted from a common serial data recording module (serial delta acquisition module) 21 to the device control network 15 and are supplied to the monitoring system 7. There the respective system data are recorded and the devices are checked in real-time, and the respective positions of the documents are tested concerning their correctness with regard to the print job.

Further details of such a measurement system 17 are specified in U.S. Pat. No. 6,137,967. The content of this patent is hereby included by reference in the present specification.

The finished printed documents 23 can again be recorded with a barcode reader 11b that, for example, is connected radio-controlled with a corresponding control device 10b, which in turn supplies its data to the monitoring system 7 via the device control network 15.

Figure 2:
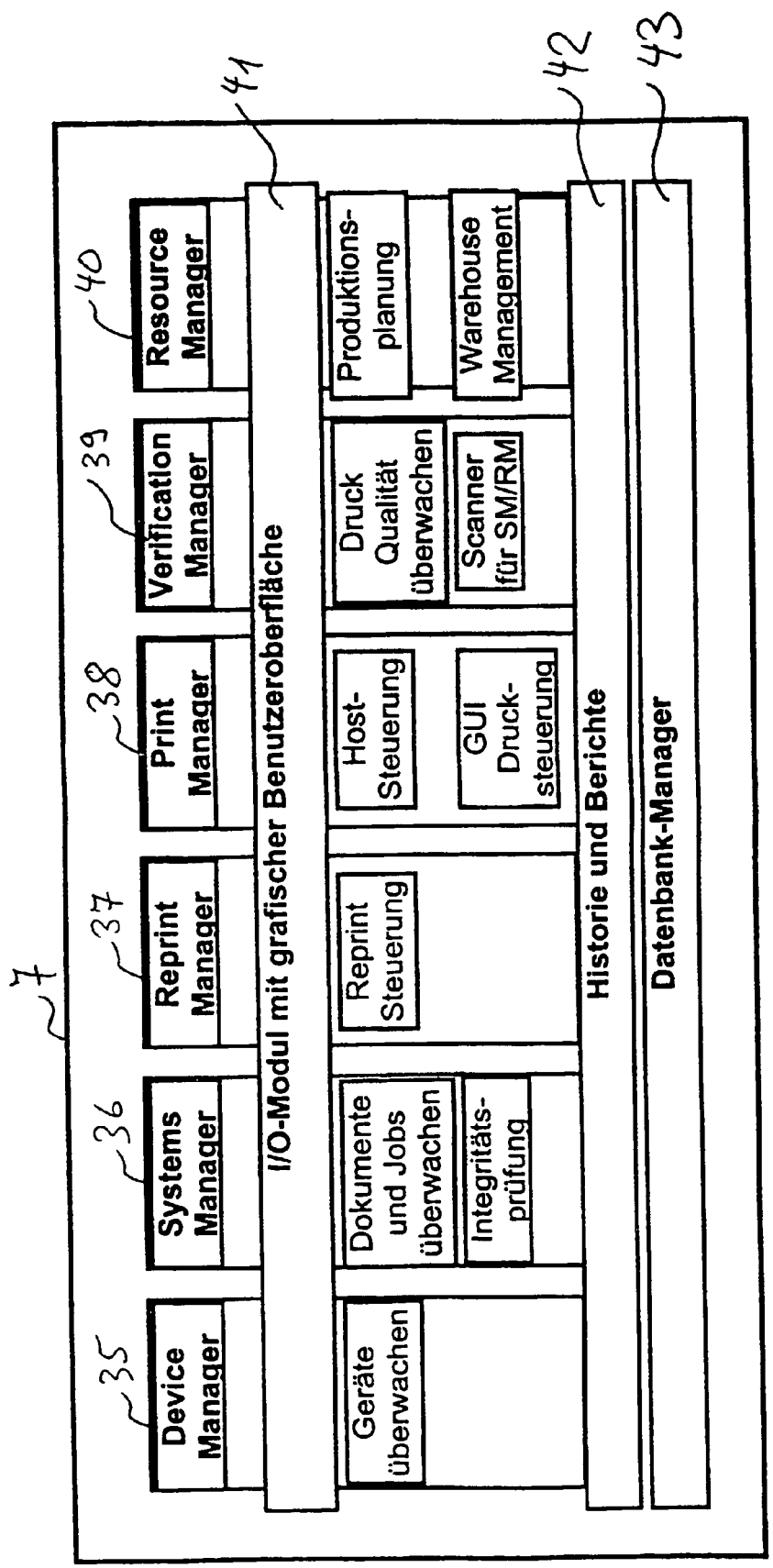
FIG. 2 illustrates components of a monitoring device.

FIG. 2 shows system components that are implemented within the monitoring system in the form of computer program modules (software) and/or hardware elements. As long as they are designated identically to elements of WO 02/19182 cited above, they also perform substantially the same functions. The content of this publication, in particular specifications of the components device manager, system manager and print manager, are hereby included by reference in the present specification.

The device manager 35 primarily performs the task of recording machine data of the participating devices of the document production system. Both static and dynamic machine data are thereby stored in the overall monitoring file 9, as the case may be with specification of the point in time claimed for a specific event. The respective checking devices supply their corresponding machine data in a corresponding format event by event or file by file (see FIG. 7). The device manager 35 monitors all devices participating in the document production event.

The system manager 36 records all information occurring with the execution of a document production job, for example the number, the size and the parameters of the jobs to be processed, their degree of completion and duration, as well as the allocation of the devices on which the document production event is processed. The entire document production process can thus be monitored and controlled from the generation of the production job to its completion. The operation data on the one hand comprise job data of an entire production job, in which a plurality of individual mailings and/or documents are comprised. On the other hand, the operation data also record data document by document, as well as characterizing data of individual pages that are associated with a document as identification. Such document by document data are generated, for example, in a first work step, in particular printed on the document as a barcode and newly read and recorded in a later processing step.

Respectively associated with a document production job is a file, what is known as a job ticket, in which the job data significant for the respective job are filed. The job data can thereby be provided both electronically via the system generating the job, for example on the print server 16 or on the host computer 3, or can be read in via machine-controlled reading methods from printed recording media in the form of barcodes, OCR scripts (optical character recognition) or MICR scripts (Magnetic Ink Character Recognition).

With the system manager 36, it is thus on the one hand possible to track the production progress of a job or document (tracking function) in which data are recorded at various check points over the traversing jobs, documents or pages via distinct identification numbers and are transmitted to the monitoring system. A comparison of the actual data with predetermined nominal data of the job can be implemented, and duplicate incorrect or missing jobs, documents or pages can be recognized and noted. Furthermore, an integrity check can be implemented in which the data specified by the individual check devices are checked among one another with regard to their data integrity. Furthermore, the system manager 36 can deliver direct commands to the processing computer 4, the respective print device and/or to the host computer 3 via a simple graphical user interface. For this, it is in particular provided to also integrate the job generator into the system manager 36.

With the reprint manager 37, a nominal list is already generated in the job collector 23 (spooler) for all documents of the production job, and later the actual production progress is compared with this nominal list. As soon as a document was not processed or was just processed incorrectly, a notice to reprint this document is generated and the reprint can occur automatically or upon request by an operating personnel. The reprint manager controls the reprint event.

The print manager 38 and the reprint manager 37 are moreover in the position to monitor the production progress spanning devices. For example, they generate a stop signal when a mailing or a document appears twice at a print post-processing device. In particular given enveloping devices, a mailing or a document may not appear twice. For this, all mailings that are processed at inserters are compared with the already processed mailings or documents of all inserters, and, given a match, a stop signal is sent to the inserter at which the document newly appeared (see also FIG. 17).

The print manager 38 is the control connector between monitoring system 7, host computer 3, spooler 24 and print devices 6a, 6b, 6c or, respectively, 6d. It serves on the one hand to control the processes in the host computer 3, and on the other hand collects spool information from the spooler 24 for control of the process and for the job tracking. Furthermore, it can deliver direct commands to the respective print device and/or to the host computer 3 via a simple graphical user interface.

The verification manager 39 serves to monitor the print quality; for this, it can in particular cooperate with scanners that scan a printout generated by the respective print device and checks its quality. A corresponding system in which a barcode reading device (laser scanner), an MICR reading device for magnetizable toner (MICR stands for magnetic ink character recognition), and a digital optoelectric camera (CCD) is provided to check the print quality is, for example, specified in the U.S. Pat. No. 6,137,967 A. The content of this patent is likewise included by reference in the present specification.

In what is known as the resource manager 40 of the monitoring system a component is provided in which the production planning as well as the warehouse management can be handled. New print jobs can thereby be planned and generated (in particular in the running print operation) in which the current print devices in use and their production progress are incorporated into the production planning.

The databank manager 43 controls the delivery of check information, job information, etc. to the databank 7b.

All components (managers) of the monitoring system 7 are connected among one another via an I/O module with graphical user interface 41, as well as with the remaining components of the document production system 1. A report module 42 serves to generate histories, reports and printouts. Such histories and reports can be generated from the databank 8 and are transferred via an application program interface (API) to application programs such as, for example, the program Microsoft Excel®, and/or printed out via a separate printer (not shown) directly connected to the monitoring system 7. The data export via the API interface enables only read access to the databank 7b. Data of the databank 7b, in particular the protocol file, can be rerecorded in an archive, for example in a CD-ROM writing device for long-term archiving on CD-ROM. The archiving of the protocol file 10 thereby has the advantage, with regard to the archiving of the entire monitoring file, that only archive-relevant data for production and/or quality assurance must be stored, and thus a relatively smaller data volume on the CD-ROM is sufficient. All previously specified managers (see FIG. 2) provide operation data and monitoring data for the protocol file 10 for this purpose.

Figure 3:
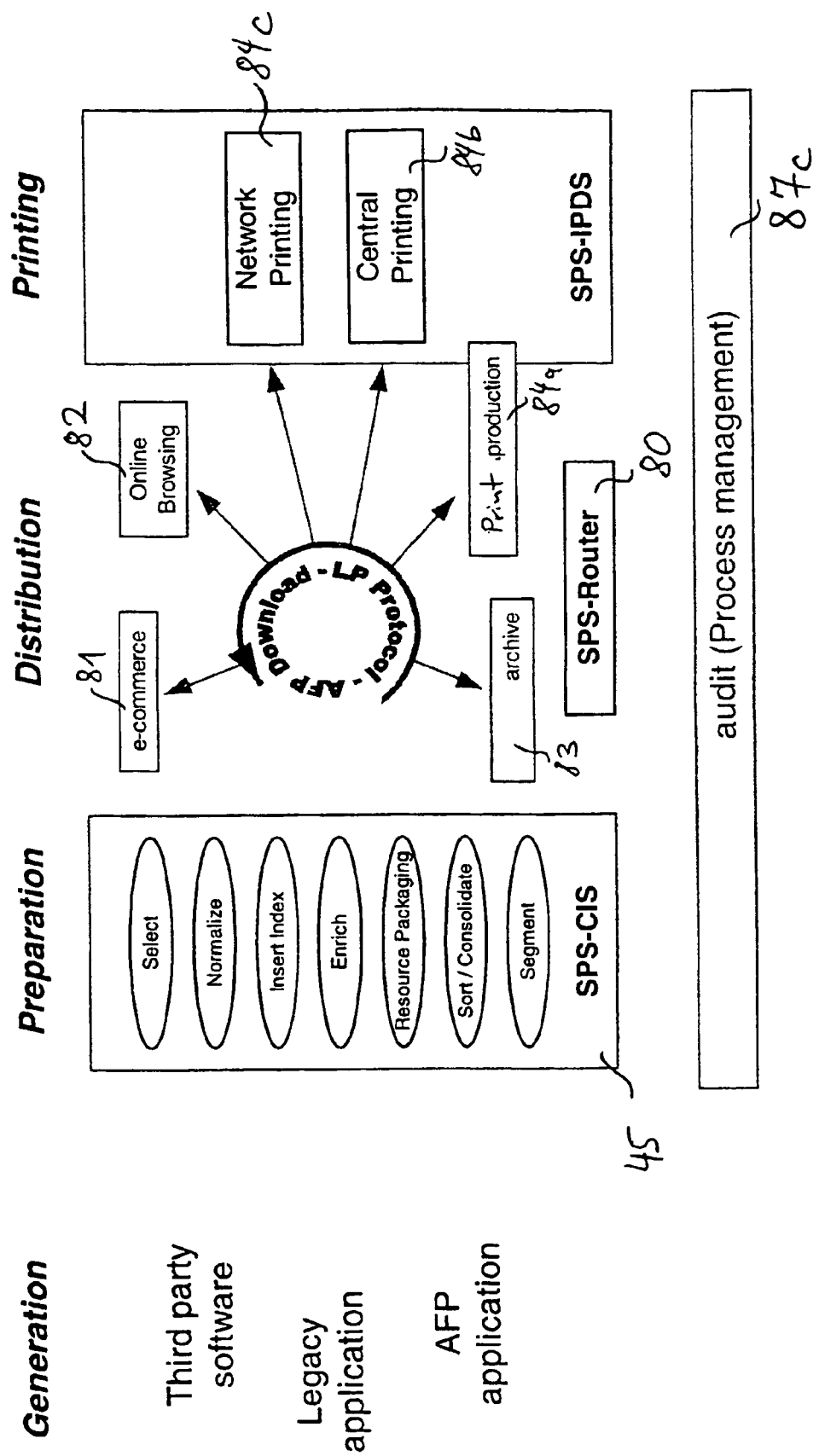
FIG. 3 illustrates work flows in a document production system.

In FIG. 3, four basic stages are shown to process document data in a document processing system with attached print system. In a first phase "generation", document data are generated or read into the document data system. This can in three different manners, namely on the one hand via generation of a document with an application software (third party software), for example via a word processing system, a graphic image generation system, an office scanner that scans paper documents, or the like. On the other hand (legacy application), existing document data can exist in the form of an AFP data stream (AFP application) or a format not specified further (legacy application). In a second processing stage "preparation", the respective data are processed for the respective output steps (distribution printing). For this, a control program (SPS) serves that controls the three processing stages "preparation", "distribution" and "printing", adjusted among one another in the form of a production process. It comprises the three modules for the three processing stages. In the first module, the processing module 45 (SPS-CIS), the input data streams are normalized to a uniform format (AFP), the data are indexed, augmented with control data, resource data are generated, a resorting/consolidation of the data stream are effected, and finally the data streams are output-specifically segmented, such that the subsequent processing stages (distribution, printing) can be implemented with higher speed.

In the processing stage "distribution", a distribution module "SPS-Rooter" 80 serves to distribute the print data to various output channels. With the distribution module 80, the data can be alternatively supplied to systems for electronic transmission (for example per e-mail) in an e-commerce module 81, to a display module (online browsing) 82, to an archiving system 83, or to print production systems 84a, 84b, 84c. In particular, special print systems can thereby be used for output of the print data in a network (in particular a network of print devices connected via a network) 84c or via a local central print system 84b located at a specific site. The process stages of the processing, the distribution and (as the case may be) of the printing are monitored by monitoring modules 87c.

Figure 4:
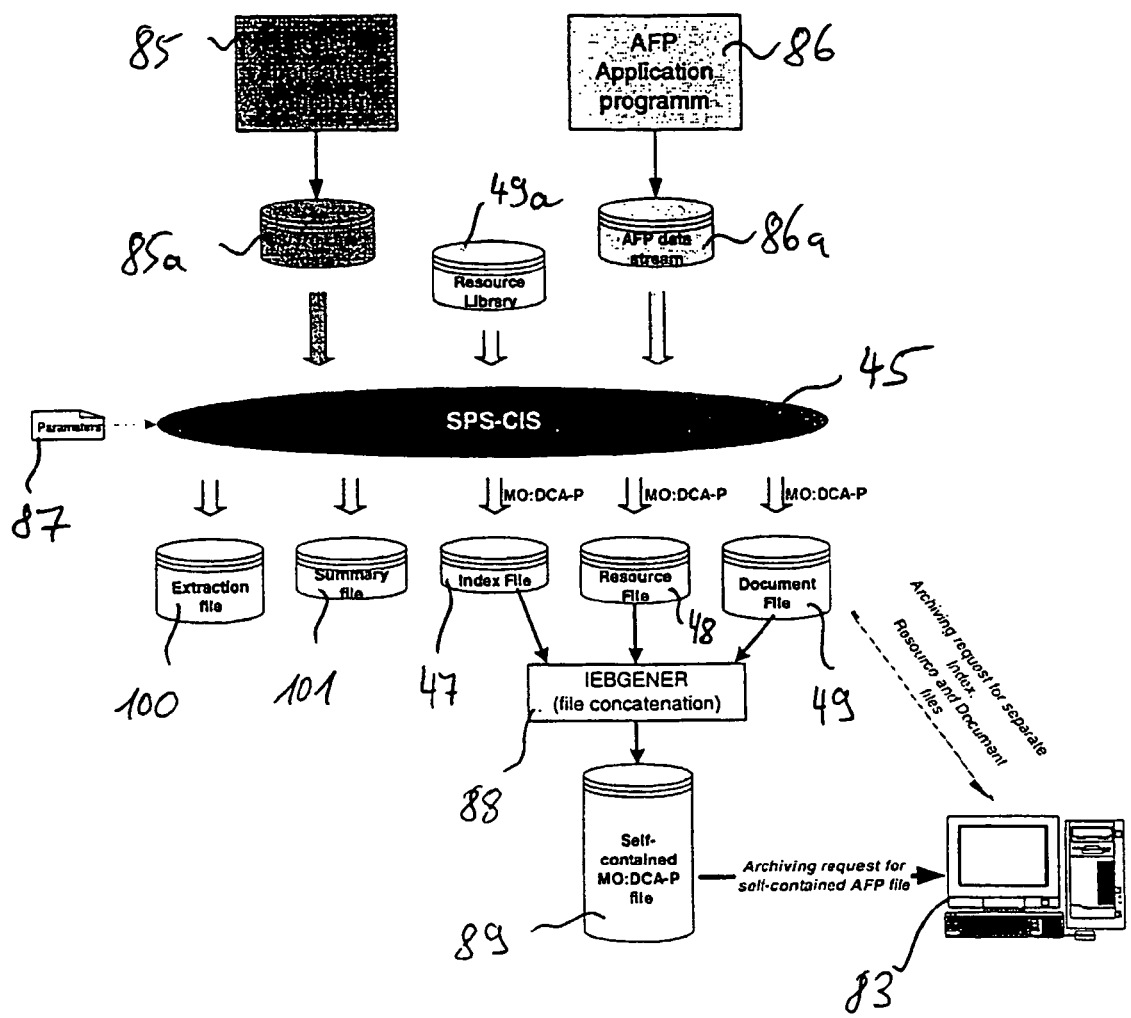
FIG. 4 illustrates various processing steps and file structures in the processing of document data.

In FIG. 4, the document data processing steps provided by the processing module 45 (SPS-CIS) are shown as an overview. Print data are imported in the form of S/370 line data (block 85a) from an unspecified application program 85 (legacy application program) into the processing module 45. An AFP data stream 86a is correspondingly transmitted from an AFP application program 86. In this case, a resource library 49 is regularly assumed that comprises resources (overlays etc.) according to the advanced function presentation specification. The document processing events in the processing module 45 are controlled with parameters 87 that can be read in or input from the outside into the system.

Five files are generated with the processing module 45 in which, respectively, the results of the processing are combined. In a first file group, index data 47, resource data 48 as well as document data 49 are filed in a production-adapted data stream format (MO: DCA-P) These data are chained with one another in a chaining event 88 and form a processed document data stream 89 that can be transmitted to the output systems, for example to the archive system 83. From the archive system 83, various queries to the system are presented to the system, via which either the processed print data stream 89 and/or separate data are retrieved, such as the index data 47, the resource data 48, or several of the partially processed document data 49.

Furthermore, an extraction file 100 and a statistic file 101 (summary file) are formed with the processing module 45, controlled by the parameters 87. Predetermined data of a document, a mail piece, a sheet or a page are stored in the extraction file 100 together with the respective identification data of the corresponding data unit (document, mail piece, sheet or page).

Statistic specifications about the overall print data stream of a job, for example the number of the pages of a document, are stored in the statistic file 101, likewise controlled via the parameters 87.

Figure 5:
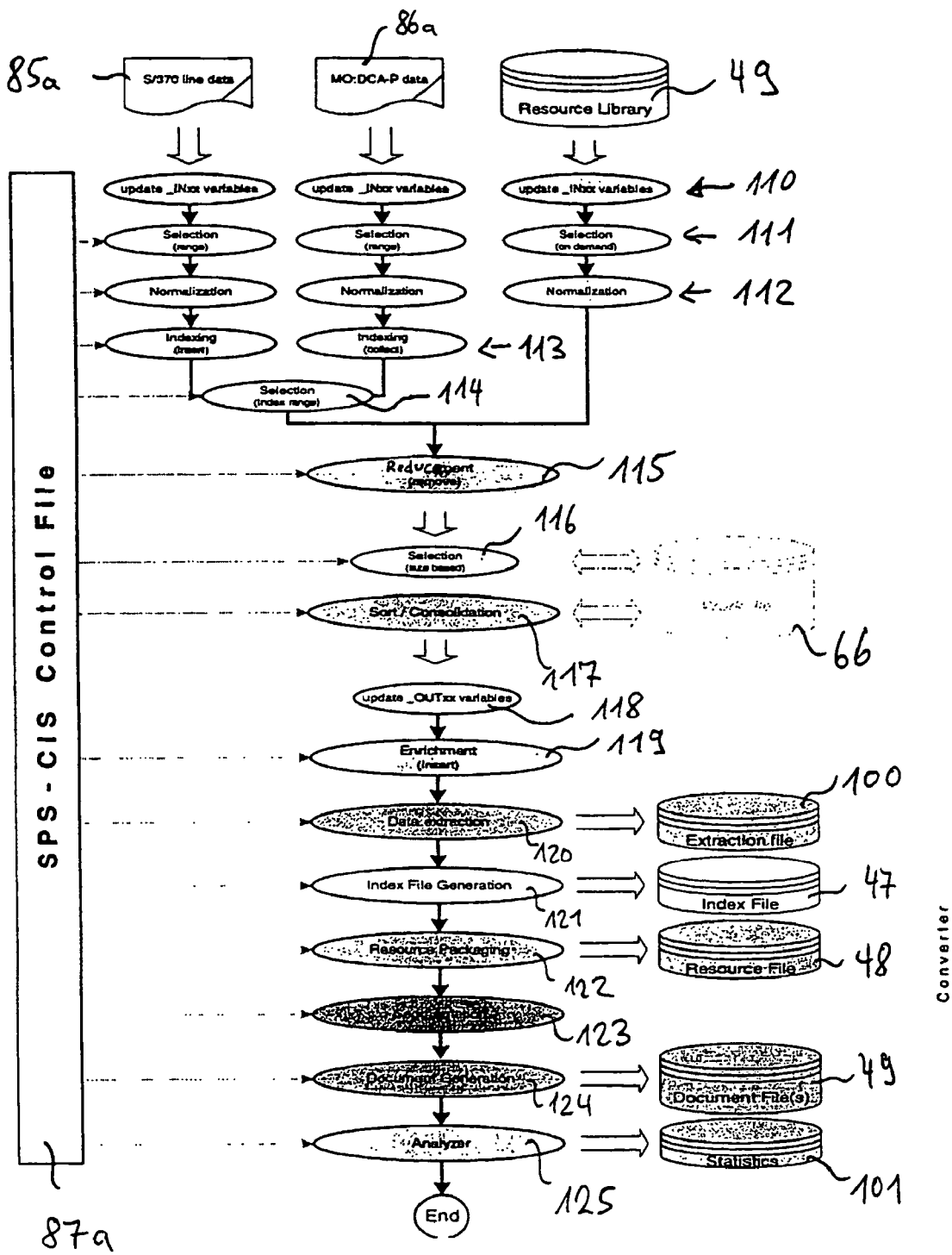
FIG. 5 illustrates detailed work steps to generate the document files shown in FIG. 4.

In FIG. 5, the process flow is shown which runs within the processing module 45 (SPS-CIS) in the course of the normalization process and of the conversion process. Input data streams 85a, 86a, 49 are thereby respectively examined in a step 110, and the control information thereby found are stored in an input variable file. Via the storage of the input variables, at any time the characteristic of the original input print data stream can be reproduced or established by the processing system 45, independent of whether data were selected, introduced and/or removed in the further processing stages. This is valid both for document data and in particular for control data.

In step 111, those data are selected from the data stream that are necessary for processing of the entire job. Given this type of the range selection, it can be differentiated between direct document ranges (for example mail pieces numbers 501 through 1499 and number 601 through 2000) and (on the other hand) a values selection, for example a selection using absolute page numbers that comprise a typically open document range. Furthermore, missing resources are sought in resource libraries and are read into the processing system in order to supply these data to the output-side resource file 48 (selection on demand).

In the subsequent normalization step 112, the input data are transformed into a uniform, system-default data format and into a uniform syntax. This event is also controlled via the control parameter deposited in the parameter storage 87a. In a step 113, any indices that are already comprised in the input data streams 85a or 86a are buffered. In step 114, parameters are stored and any indices are selected that are still necessary for later data output or data processing steps. Via the introduction of indices in simple, unstructured S/370 line data, a hierarchically structured data stream corresponding to the AFP standard is achieved, via which each document is structured. This is the condition for the subsequent functions implemented in the control module 45, such as data extension, sorting, segmentation and so forth.

A further selection step that can be effected on input print data is the selection of documents using their index contents (index range selection). Only such document data whose index specifications lie within the selected index range are thereby further processed. All other document data are not further processed and are not adopted into the output-side document file 49 of the processing system 45.

In the processing step 115, any data parameter that is no longer necessary for the further processing stages are controlled are removed (removal) from the complete data, which comprise both the variable data 85a, 86a and resource data 49. Via this data reduction, in particular such data that are overloaded with many unnecessary control data are substantially reduced, such that the subsequent processing steps can be less elaborate and thus performed more quickly.

Resource data that occur repeatedly (for example within an MO: DCA-P data stream) are also removed from the data stream in order to be rid of redundant information. It is thereby in particular provided to extract inline resources from the data stream and to merge these resource data with the other (external) resources 49.

In step 116, the print data are examined with regard to their range-by-range size, meaning per print job, per document, per mail piece, or per sheet. The data are separated and split up into two sub-ranges when they exceed a predetermined maximum size. The split up buffer files are temporarily transferred into a working storage 55. Subsequently, a resorting of the data stream according to predetermined sorting rules occurs in step 117. In step 118, all system-internal variables are stored as output-side variables, or their values (for example document numbers, mail piece numbers, total page number and so forth) are updated.

The splitting of the data stream according to the method step 116 is advantageous under the following document production situations:

During a job planning (job scheduling), in particular when mail pieces should be selected or excluded due to their size, for example because an inserter device or a stitcher can only process a maximum number of sheets per mail piece or document.

during reproduction events, when specific documents, mail pieces, or sheets must be newly printed (for example because a subsequent processing step such as the printing was incorrect), and a new barcode control information must be introduced in order to differentiate the reproduced document from the first incorrectly printed document, and to be able to correctly insert the reproduced document into the production flow.

during test phases or monitoring check events, when accidentally elected pages should be processed.

The specification of the selected partial measurement in the processing step 116 occurs in particular via specification of a maximum number of sheets that may be received by a specific range of the document data stream (document, mail piece, sheet or page). Typically parameters are specified here via maximum sheet numbers. However, these parameters can also additionally be controlled depending on the type of sheet (for example the paper weight given individual sheets), such that the selection of the work packages is optimally adapted to the subsequent system parameters.

In the step 119, the processing system 45 additionally inserts data into the data stream. In particular, barcodes are thereby directly inserted into the document data that are permanently connected with the document and, as the case may be, are also printed out. The barcode data of a data section (document, mail piece, sheet, job) are in particular respectively printed on the first page and on the last page of the corresponding section. Additionally, an empty page can respectively be inserted at the beginning and/or at the end of the section, on which this barcode and/or additional specifications for the respective section are printed in plain text.

These additional data serve in particular to monitor the print production process and/or for the control of subsequent method flows or devices. In addition to barcode structures (BCOCA), text block structures (PTOCA), indexing information or other, suitable control into can also be inserted. The insertion can occur on all different document ancillaries (page, sheet, mail piece or document). User-defined characters as well as system-internal variables can also be introduced into this process and used to insert the control data. Via the insertion of the control data, the subsequent production flow can be optimized, because the inserted data are exactly adjusted to the subsequent process or the devices involved therein.

Controlled via parameters in processing step 120, data are filtered out of the data stream (data extraction) that are necessary for specific further processings. Via the generation of an extraction file 100, these data are made available optimized for access, because the extraction file 100 has a comparably smaller extent. These data can therefore be used for real-time checking of all involved devices in the entire production system 1.

In the steps 121 and 122, current index data are generated, the resources required for the print job are packed, and the respective data are stored in files 47, 48.

The segmentation step 123 serves to segment, controlled by parameters, the remaining document data, for example to form segments of a maximum of 1000 sheets. These segments are closely linked with the control data (barcodes) that are inserted in step 119, such that each segment respectively comprises barcode data at the beginning and at the end for printing. In particular the manual further processing in subsequent process devices can hereby be supported, because the barcodes are reliably readable at the beginning and at the end of the stack (print stock 23).

The document files 49 are formed and stored in step 124. Finally, a data analysis 125 runs parallel to all processes. All data required for static purposes are thereby picked and a statistic file (summary file) 101 is formed.

Figure 6:
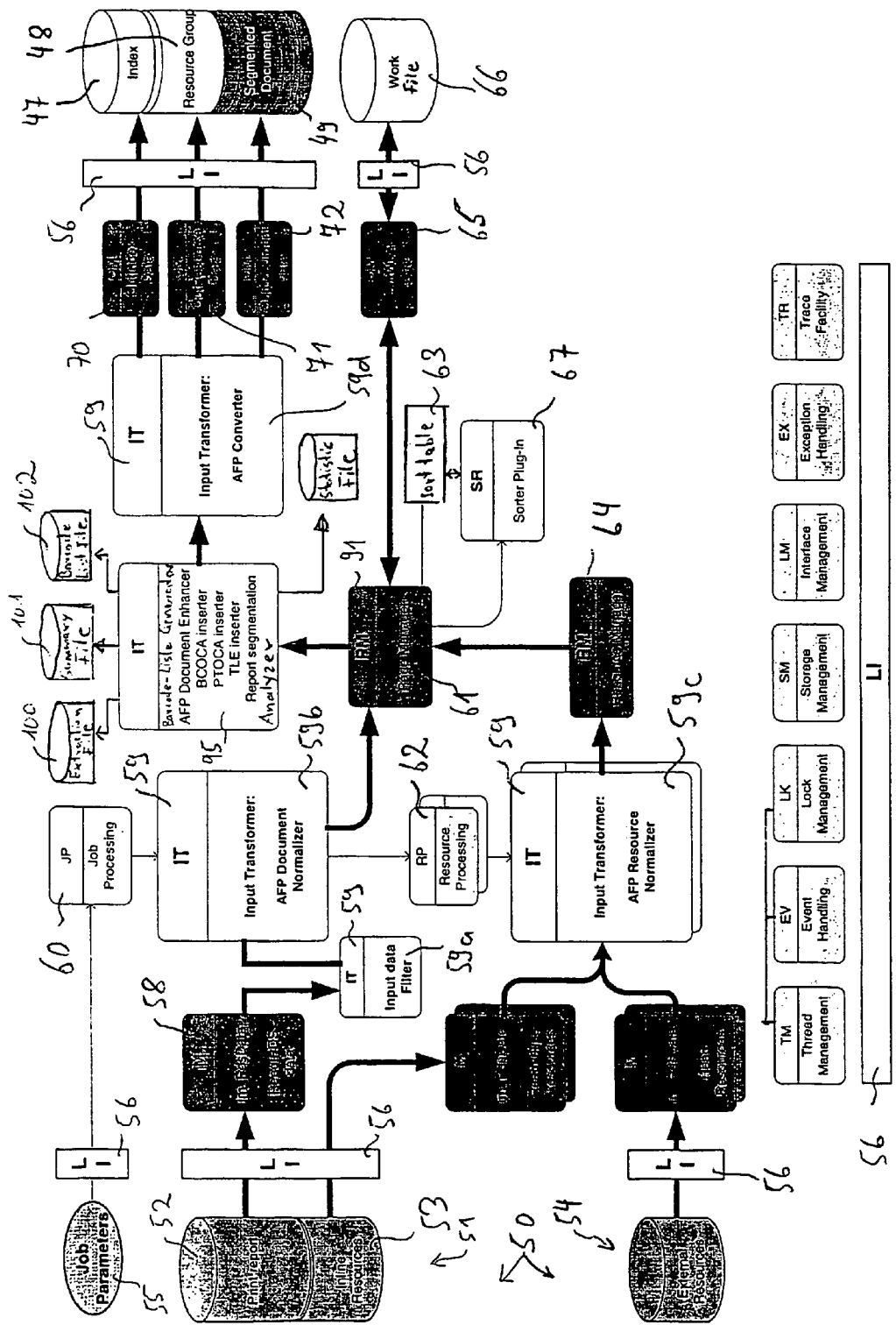
FIG. 6 illustrates a detailed flow chart for processing of document data streams according to FIG. 5.

In FIG. 6, software system components and their functional cooperation (as well as files thereby generated) are shown that affect the method flow shown in FIG. 5 or, respectively, the changes to the document data shown there. The method and the system components preferably run on the processing computer (file server) 4, however, they can also run on another computer such as, for example, on the host computer 3 or on the monitoring computer 7a.

An input print data stream 50 is thereby first classified in a primary data stream 51 and an external resource data stream 54. The primary data stream 51 comprises variable print data 52 (print report data) and integrated resource data 53 (inline resources), while the external resource data stream 54 merely comprises external resources.

The input print data, as well as job-specific job parameter data 55 (block "job parameters), are read via a logical interface 56 (LI) into the conversion, indexing and sorting system 57 (CIS). The logical interface 56 thereby works as a superordinate process control that monitors, releases and (in case of need) blocks the various individual processes. The logical interface 56 comprises for this a row of sub-modules that are shown at the bottom in FIG. 6, namely a module of the process control (threat management, TM), a module for control of events (event handling, EV), a module for coordination of the storage access of various processes (lock management, LK), a storage management module (SM), a non-system-specific interface management module (LM), a module for control of status information (trace facility, TR). The logical interface 56 is thereby designed system-specific, meaning adapted to the superordinate operating system such as MVS, BS 2000, UNIX or Windows NT. The remaining system components shown in FIG. 6 are operating system-independent, such that a simple change from a first operating system to a second operating system is possible via adaptation of the logical interface 56.

An import module 58 "im_PdsData" serves to import an incoming print data stream. The read-in data are processed in an input transformation module 59, whereby the variable data 52 are first filtered in a process 59a, are normalized in process 59b (controlled via the job-specific parameter 55 provided by the job processor 60) to an internal AFP data format, and finally are transferred to the page processing module 61 (page manager).

The values of all parameters that are required for normalization, indexing, sorting and converting the print data stream are comprised in the job parameters 55. Via the process data supplied from the job processor 60 to the input transformation module 59, all items of information in the system are known that are required for the indexing of the primary data stream—insofar as these are not already indexed on the input side—and that are required for sorting the primary data stream 52.

During the normalization of the variable data 52 in the process 59b, already existing index information—in particular given primary data that already exist in the AFP print data format—are identified and prepared, in order to be able to generate a sorting table 63.

In the course of the normalization in the processing process 59b, primary data that do not already exist in the AFP print data format (for example S/370 line data) are translated (converted) into the print data format AFP, and index information are inserted into the AFP print data format corresponding to the parameter values provided by the job processor 60. This index information is later likewise used to assemble the sorting table 63 from the page processing module 61.

In the course of the normalization process 58b, it is also established which resources are associated with the primary print data stream 52, and a corresponding normalization process is started in step 59b for the corresponding resources via notification via the resource processing unit 62. Each resource—for example character sets, watermarks (overlays) or page segments—which is required in the primary data stream thereby effects a normalization process of the corresponding resource. The entire system is thereby designed as a multi-process system, such that both the normalization of the primary data stream and the parallel (simultaneous) normalization of a plurality of resource data can occur. Each required resource data set is thereby normalized independent of the other resource data sets, and namely, respectively only once, independent of how often the corresponding data of the resource data set are required in the primary data of a print job (job).

It can thereby be specified in the job parameter data 55 which external resource data 54 (resource data library) are required for the respective print job.

The resource data normalized in the process step 59c are supplied via the resource manager module 64 and the page processing module 61 (page manager) directly to the AFP conversion process 59d, and stored via the logical interface 56 in the resource file 48 as a finished resource print data stream 71 (out resource data).

The primary data normalized in step 59b are buffered in a temporary data storage 66 (for example random access memory, RAM) via the page processing module 61, a stock removal module 65 (outwork data), and the logical interface 56. The associated information about the position of the buffered data relative to other data (page, sheet or document) is stored in the temporary data storage and is additionally lodged as a corresponding entry in the sorting table 63. The page processing module 61 thereby assumes a central control and coordination task for the association, buffering and sorting of the primary variable data.

The sorting according to the requirements of the sorting parameters of the job ensues then via the sorting module 67 using the sorting table 63 and under agency of the page processing module 61.

The variable data can be simply located in the sorting table via the entries, after the sorting event has been implemented.

The sorting process in the sorting module 67 first begins after all variable data of the primary data stream 52 belonging to a print job (job) have been normalized, and as well all resource data required for the print job were correspondingly processed. At this point in time, all resource data are already stored in the resource file 48 and all variable print data are stored in the buffer 66.

The sorting process in the sorting module 67 can be implemented as a storage-innate table sorting event within the sorting table 63. The new sorting sequence is determined via the sorting algorithm and via the contents of the index entries which are used for sorting. The variable print data store in the buffer 66 can thus remain completely untouched during the sorting event.

As soon as the sorting event is ended, the print data are recalled from the buffer 66 via the page processing module 61, whereby the retrieval sequence is implemented on the basis of the new sorting sequence in the sorting table 63. In this manner, pages, sheets and documents are retrieved from the buffer 66 corresponding to the new sorting sequence, forwarded via the page processing module 61 to the conversion stage 59d to generate the output print data stream 72 (out document data) and for filing in the document file 49. Finally, a new index data stream 70 (out index data) is also generated via the page processing module 61 from the sorting table 63, and this is filed in the index file 47. Offset values and positions of the index data in the index file 47 correspond to the offset values and positions of the data in the document file 49.

A function stage is switched between the page manager 91 and the output conversion step 49*d* that comprises the following sub-modules:

With a data expansion module, additional data (information) can be added to the output print data stream that were previously not comprised in the print data stream. This function stage can optionally be invoked, meaning depending on predetermined job parameters the following additional information can be inserted:

special, AFP-specific information that further improve the data flow customer-specific information (data inserter) such as barcode objects (BCOCA), text attributes (PTOCA) and index tags.

The function stage 95 thus comprises a plurality of modules that respectively run separate from one another and that execute corresponding method steps which were shown in FIG. 5. Among these are a document improvement module via which data are inserted or removed, modules for insertion of control data (barcodes BCOCA, texts PTOCA or tag control information TLE). Furthermore, it comprises a segmentation module as well as a data analysis module. Finally, it also comprises a generator for a barcode list that forms a list file corresponding to the generated barcodes. This list file is in particular used by the monitoring module 7, as is also explained in detail using FIG. 8.

On the output side, the document files 49 are separated from one another segment by segment, such that a segment by segment processing in a post-processing device (print device), or also distributed to various print systems, can occur.

Figure 7:
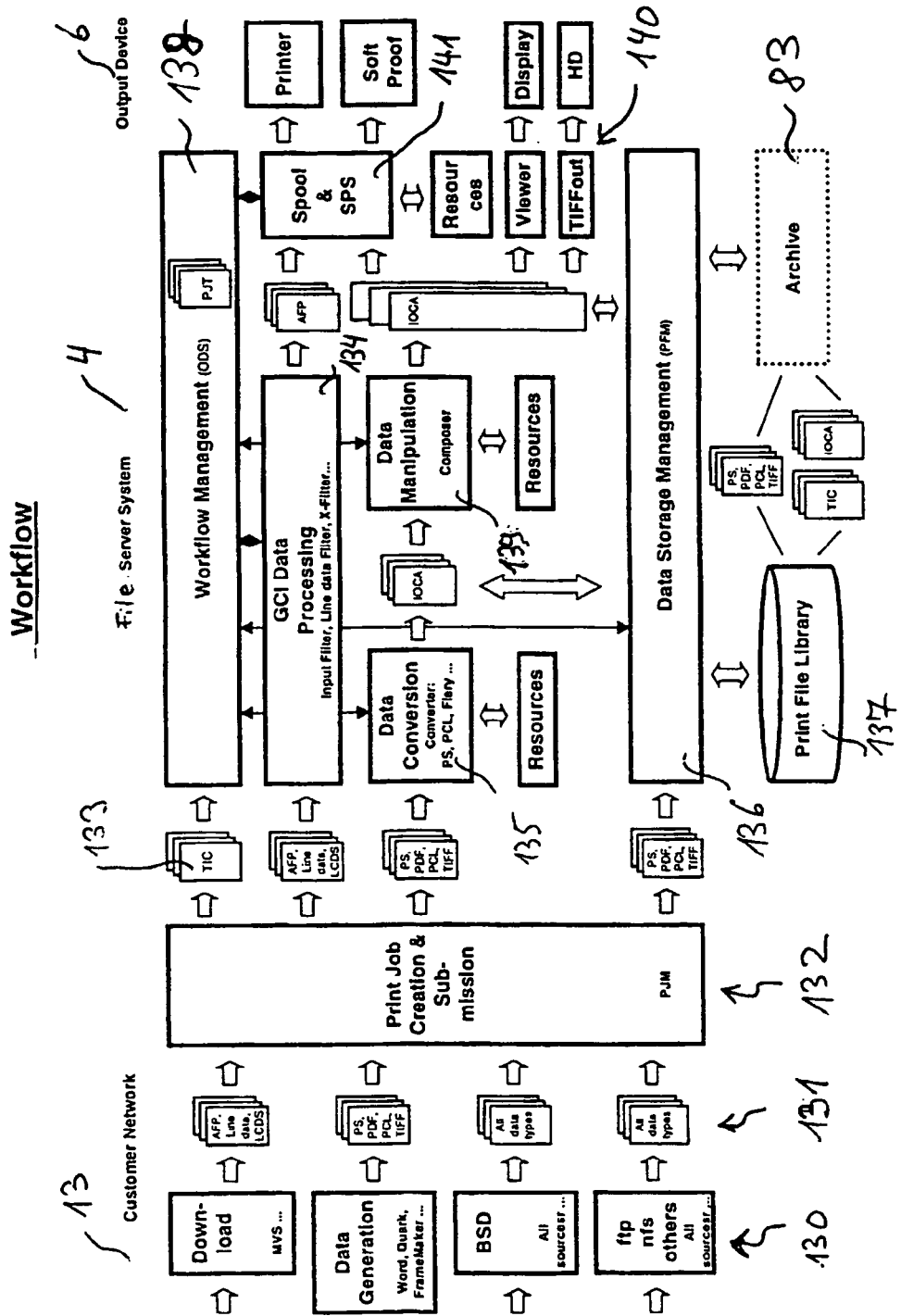
FIG. 7 illustrates an overview of various work flows in a document processing system.

FIG. 7 shows a typical work flow in a document data processing system. Document data are thereby generated on the user network 15, supplied to the processing system 4, and output on an output device 6. To generate the input data, various generation programs (download, word processing system, etc.) can be used. The respectively generated files 131 of various formats are supplied to a print job processing system 132 that generates a job ticket 133, and the remaining data are respectively supplied to suitable data processing systems, in particular filter programs 134, a data conversion module 135 and/or a data storage module 136, which stores the data in various files, for example in a buffer 137 or in an archive system 83. The job ticket 133 generated by the print job system 132 comprises diverse parameters that specify all processes in order to execute the appertaining job in the processing system 4. A job thus comprises a set of document data and the data of a job ticket 133. This job ticket 133 is supplied to a job monitoring system (ODS, order distribution system) 138 which controls and monitors the processes running on the processing computer 4.

The job monitoring system 138 identifies the parameters within the job ticket and monitors each running process in the processing system 4 independent of where the respective data are physically, directly stored within the system. It is thereby possible to distribute the process flow of the processing system 4 over a plurality of different physical units (for example personal computer). Each process is specified via input and output data. The job monitoring system 138 provides for the proper input and the proper output of these files.

After the data are filtered, processed and/or, depending on the requirement converted into new formats such as IOCA or TIFF, they are subsequently supplied to output systems 140 such as a display program, a storage, a spooling system 141 or printers 6.

Figure 8:
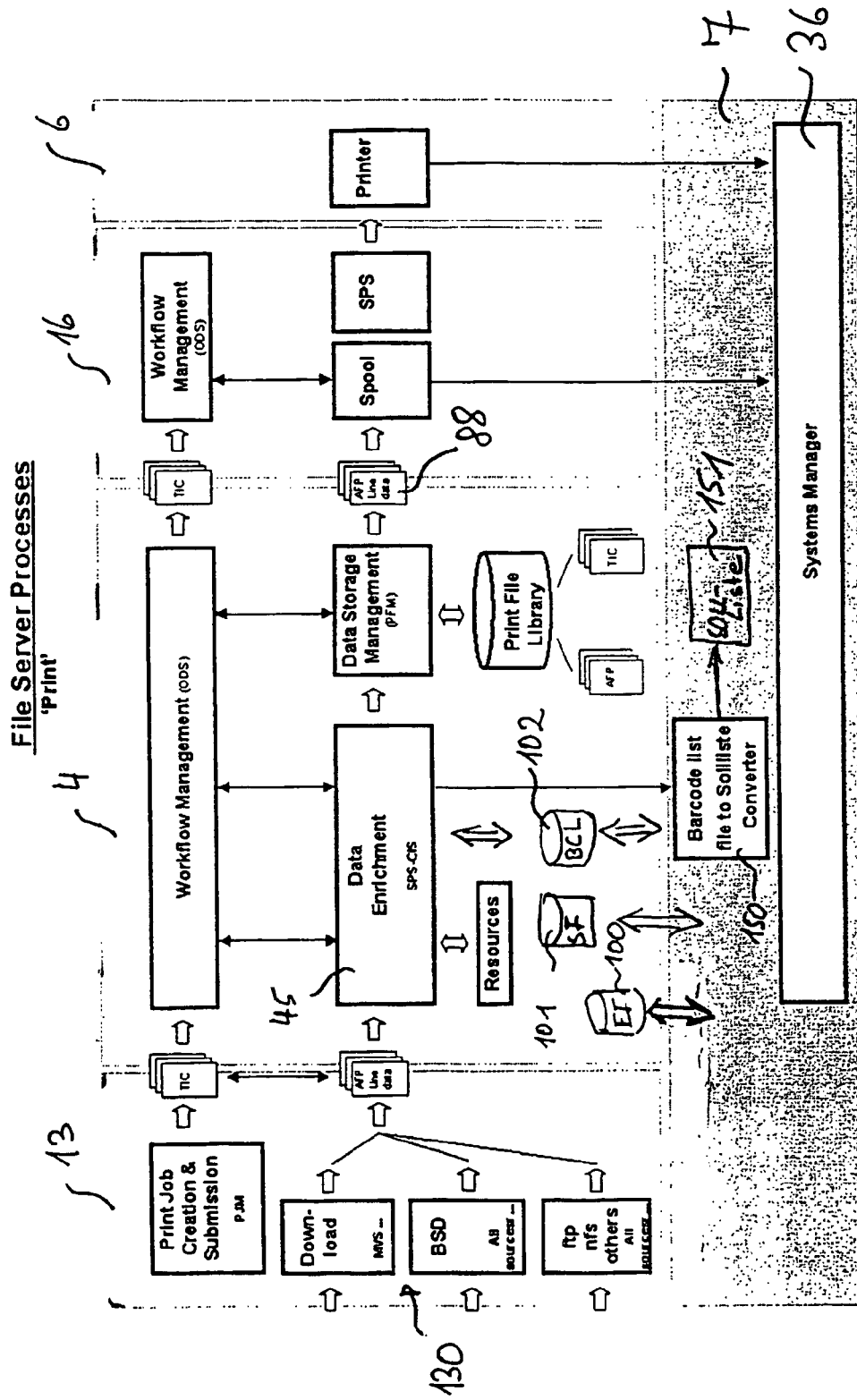
FIG. 8 illustrates work flows in a print production system.

In FIG. 8, the work flows and associated system components with which a print job is processed are shown. The print data 130 generated on the network 13 are processed in the processing system 4 with the processing components 45 (compare FIGS. 4-6). The data extract file 100, the statistic file 101 and the barcode file 102 are thereby formed. From the barcode file 102, the monitoring system means of the system manager 36 or a conversion module 150 invoked therefrom generates a nominal list that is stored in the monitoring system 7. Using this nominal list, the overall process of the printer can continuously be monitored via all involved devices (print server 16, printer 6 and, as the case may be, post-processing device 22). The respective production steps can thus be monitored device by device in real time, and an error notification or interference possibility can be immediately realized in order to control the print process. As already specified for the previous figures, the control information (barcodes) are not only processed in the nominal list 150, but rather these are also added to the output print data stream 88, such that they are also printed on the respective documents. This enables in turn the scanning of the control information (barcodes) from the document by means of barcode scanner and the monitoring of the actual printed document via the monitoring system 7.

Figure 9:
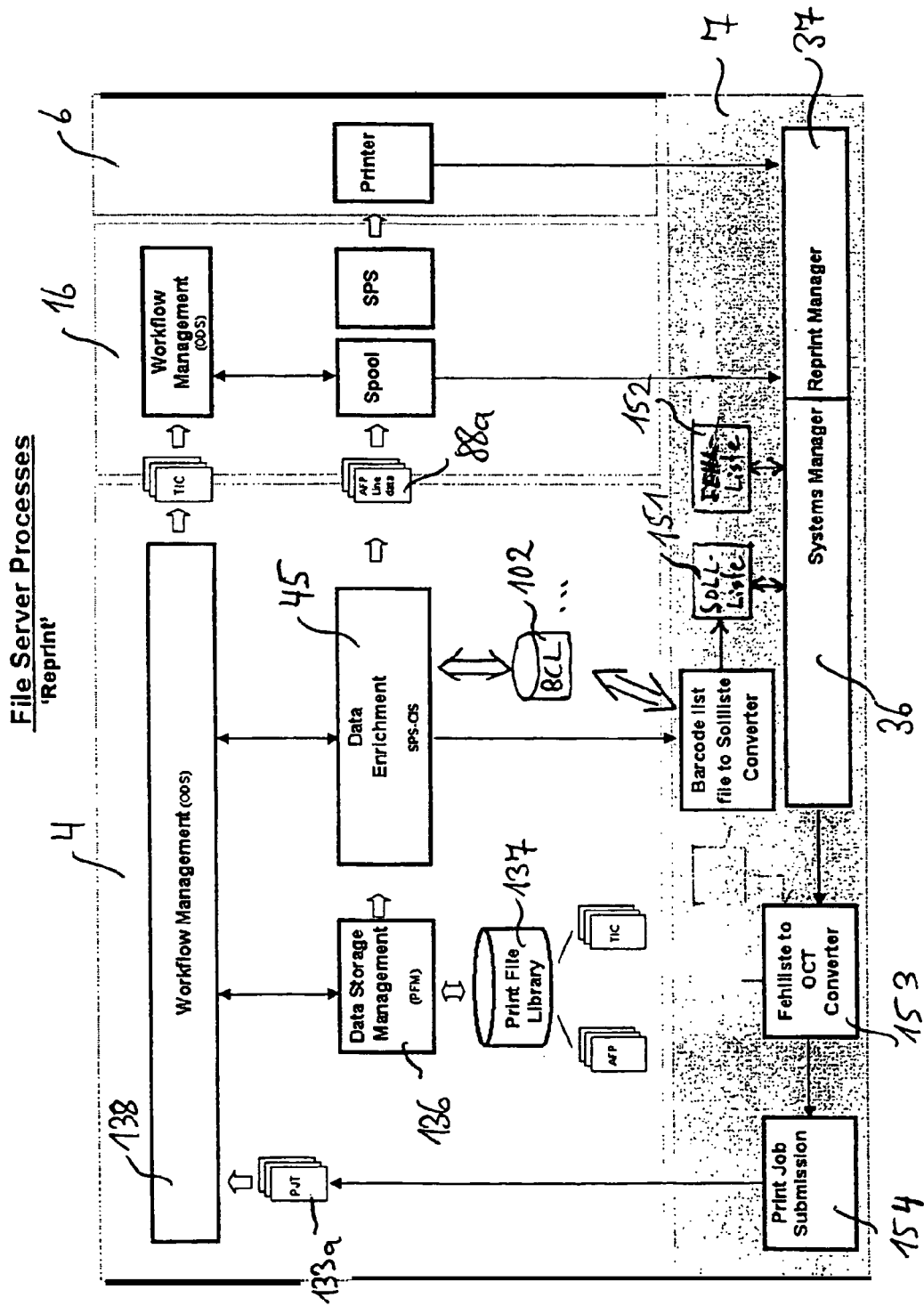
FIG. 9 illustrates work flows for reproduction of documents in a print production system.

A fully automatic reproduction event is shown in FIG. 9. As soon as the system manager determines in the monitoring system 7 that in the print production process a document is not processed or is processed only incorrectly, in particular because a document that is recorded in the nominal list is not detected on a system, the system manager 36 generates a corresponding entry in the error list 152 that is valid for this document or for this mail piece or for this page. The system manager 36 then invokes the reprint manager 37 that controls the reproduction. From the entries of the error list 152, it generates by means of the converter module what is known as a reprint job ticket OCT. After this, the reprint manager invokes in a step 154 the print job manager 132 that in turn generates a system-internal print job ticket 133*a* and transmits this to the order distribution system 138 and initiates the generation of a new reproduction data stream 88*a*.

The processing module 45 therefore cooperates with the print file manager 136 that newly extracts the requested data from the buffer 137 and supplies this data to the processing module 45. There new control data (barcodes) are again added to the data stream that identify the reproduced document, and additionally comprise an entry from which it is made clear that these data are part of a reproduction job. Moreover, the processing system 45 also stores these new reproduction data in the barcode file 102, from which in turn a corresponding updated entry is formed in the nominal list 151. The reproduction jobs can thereby also be monitored fully automatically in the system, and with high security.

Finally, the thusly generated reproduction data 88*a* are in turn output to the print server 16, that from this data stream generates a data stream directly readable by the printer 6 (for example in the Intelligent Print Datastream Format IPDS), and transmits this to the print device 6.

Figure 10:
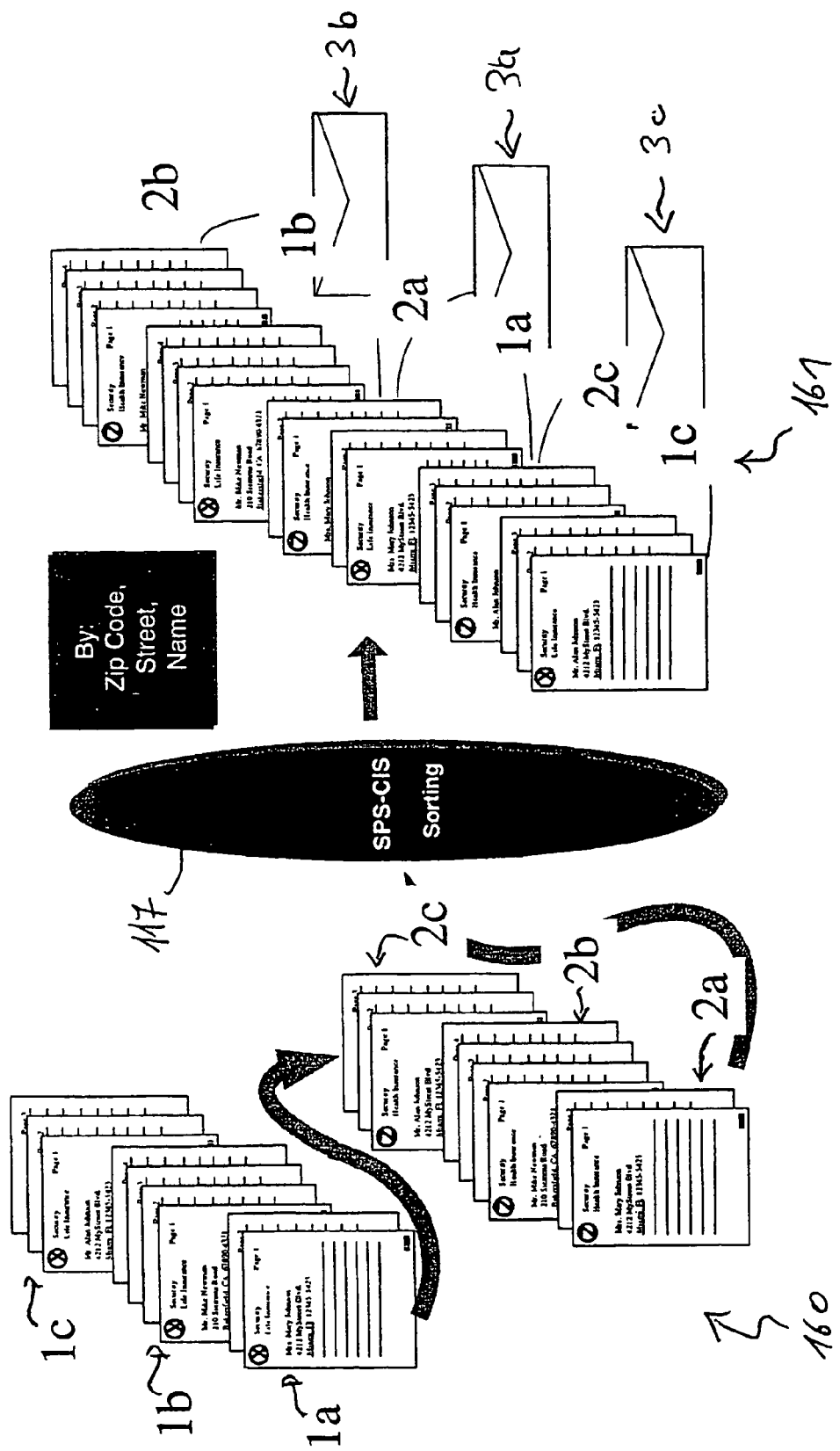
FIG. 10 illustrates the resorting of mail pieces.

It is shown in FIG. 10 how, using the processing module 45, a resorted output data stream 161 is formed in step 117 from an input data stream 160. The goal of this sorting is to generate in the output data stream the three mail pieces 3*a*, 3*b*, 3*c*, in which respective belonging documents that should be shipped to one and the same addressee are combined together in a letter envelop and supplied for mailing.

The first document 1*a* (which comprises two pages) should thereby, for example, be merged with the second document 2*a* (which likewise comprises two pages) into one mail piece 3*a*.

The merging occurs according to the criterion that name and address must coincide in the respective address fields of the documents. The resorting thereby occurs as specified in FIG. 5. Further details of such a resorting are also cited in WO 01/77807 cited above, and are specified there in particular in connection with FIG. 6.

Figure 11:
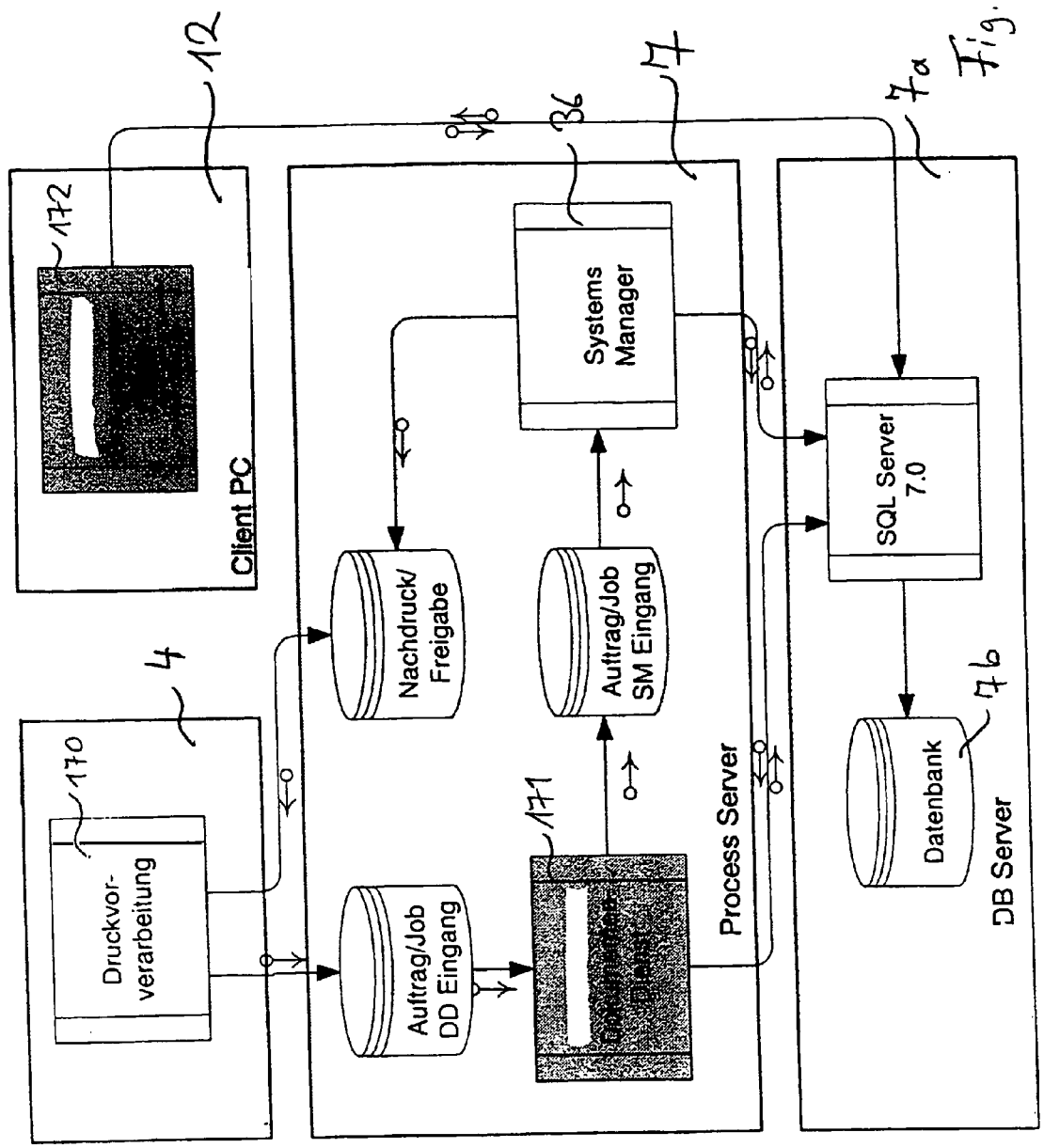
FIG. 11 illustrates various software/system modules for production monitoring that are installed scanning devices and are functionally coupled.

FIG. 11 shows how a document tracking or document search is also possible with the system. In the course of the preprocessing of print data on the processing computer 4, the necessary information for the tracking of documents (indexing data, nominal lists and job information), as well as the association of the mailings/documents with the user-defined characteristics, is thereby made available in a job file. These data are transmitted in the monitoring computer 7 to a central document service module 171. This module stores the data, in particular in a databank 7b on a special databank server 7a to which the system manager 36 also has access. Via this networking of the components, it is possible that, from every application computer 12 on which a corresponding document client 172 runs, the corresponding document data can be retrieved at any time and the current document can be localized and/or displayed. For each document, in particular the following data can be stored: processing datum in the document production system, job name, mailing number, page number, reproduction number, name, billing number, postal code of the addressee, and so forth.

The document client 172 is a dialog application with which the search for documents is possible and the results can be displayed. FIG. 18 shows a corresponding interactive display window 195.

Figure 12:
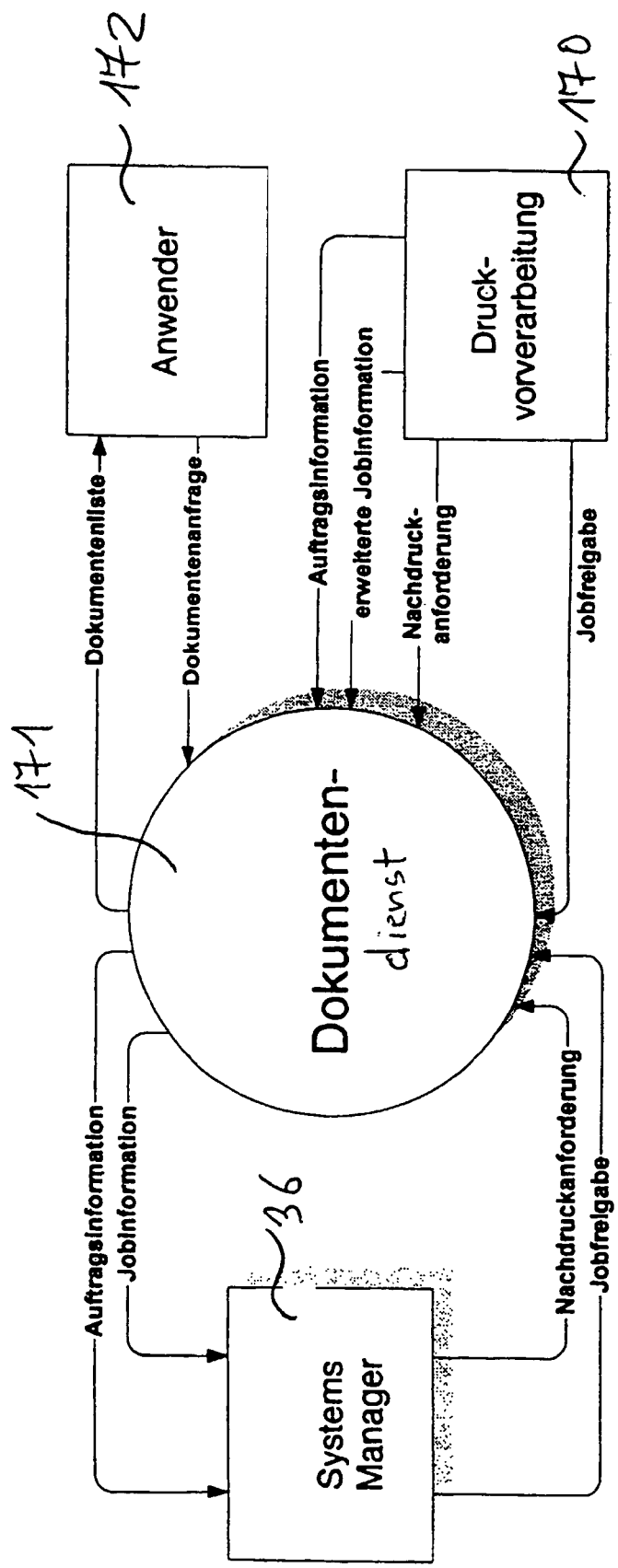
FIG. 12 illustrates a document service program.

It is shown in FIG. 12 which data the document service exchanges with the other participating components of the print preprocessing 170, the application program 172, and the system manager 36. It is the central recording and distribution point for all information concerning the document search.

Figure 13:
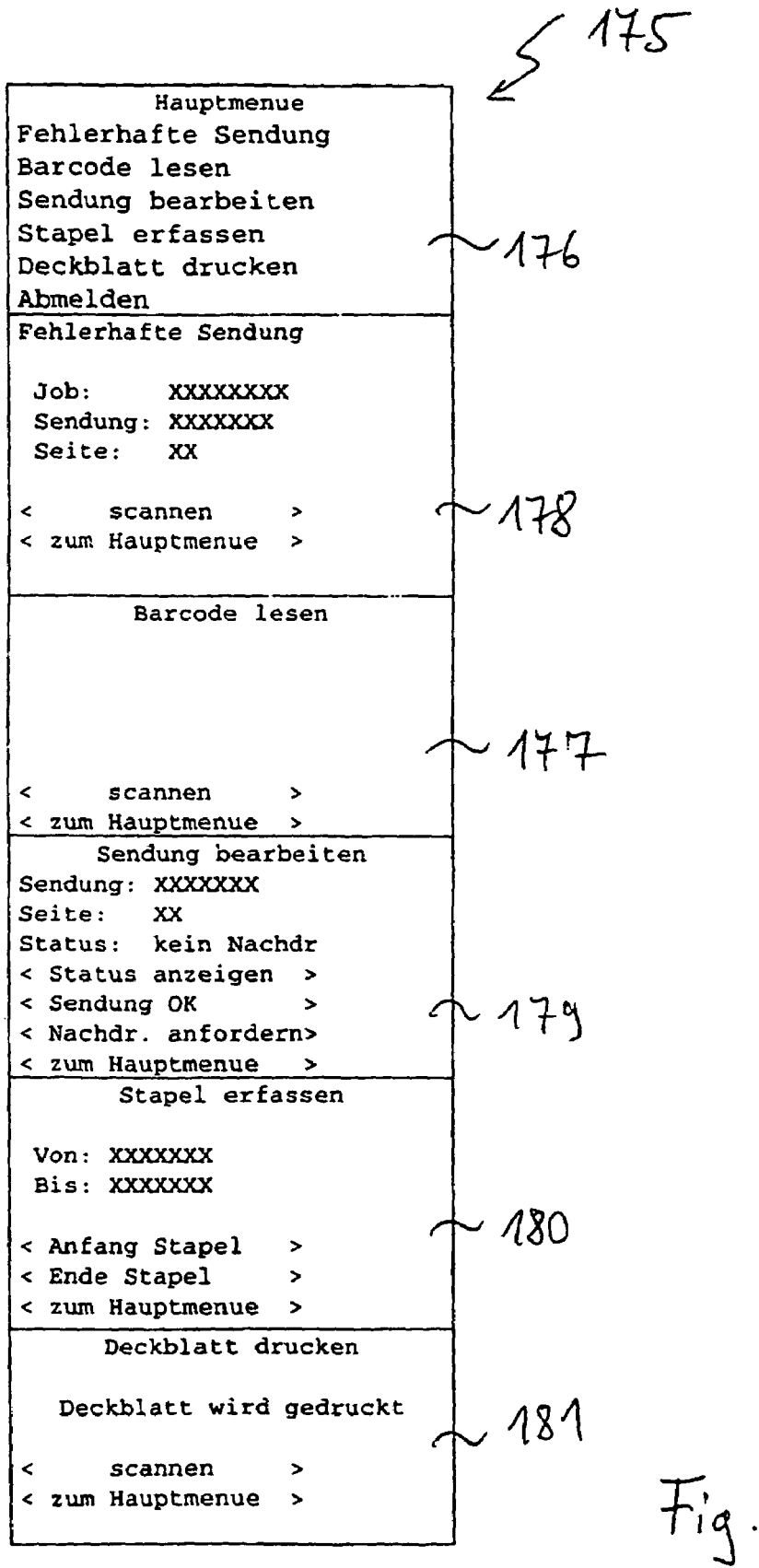
FIG. 13 illustrates the menu structure of a barcode reading system.

In FIG. 13 a menu structure is shown that is displayed in one of the barcode readers 11a, 11b. From the main menu 176, sub-menus can be invoked with which control commands can be planted on the document processing system 1. In addition to the confirmation of a currently read barcode from the menu 177, the direct control commands 178 also serve to scan and confirm an incorrect mailing, as well as the menu items 179 (process mailing) via which, for example, a reproduction of a mailing can be requested, and 180 (record stack), via the beginning and/or end of a stack can be scanned or recorded, as well as the menu 181, via which a cover sheet can be printed out for a mailing, a document or the like.

Figure 14:
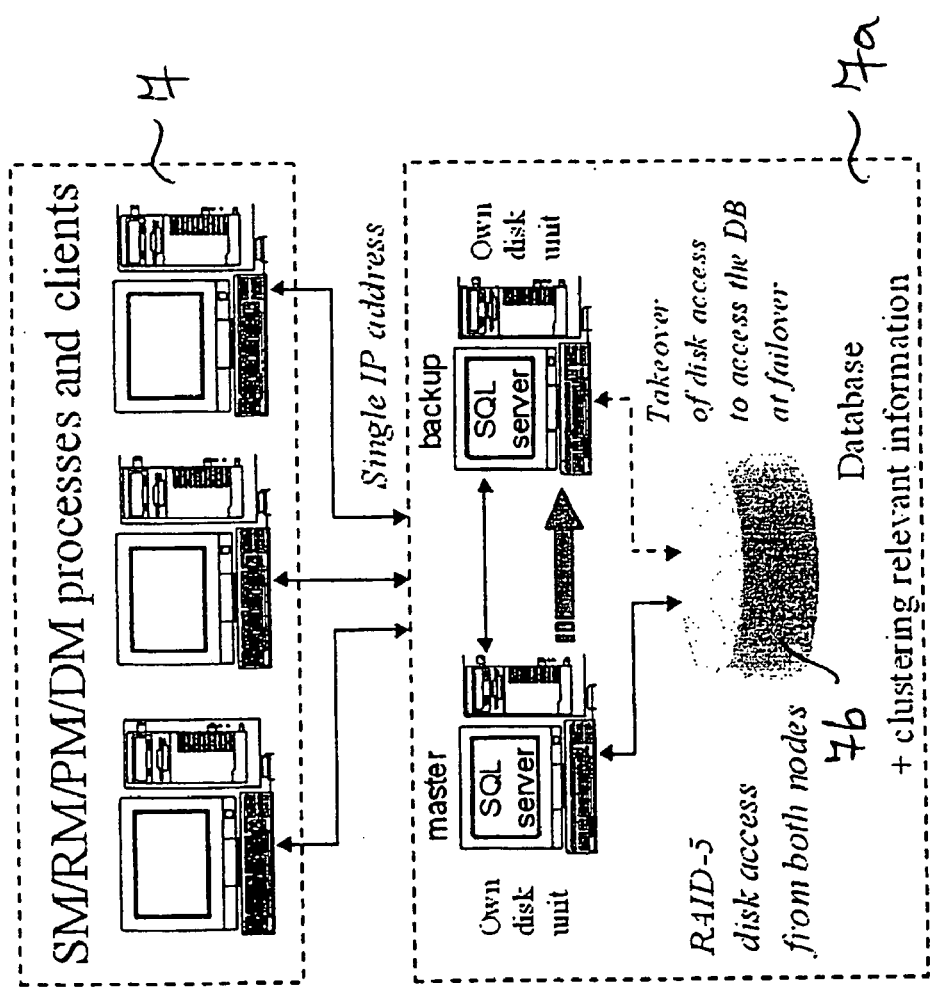
FIG. 14 illustrates a system structure for a monitoring system.

In FIG. 14, the structure of the monitoring system 7 is shown again, in which various processes such as the system manager, reprint manager, print manager and device manager run. These processes can either run together on a computer or are also distributed on various computer systems. However, they are functionally coupled, such that data of the one system can be retrieved at any time by another system. In particular the central administration of the data in the databank system 7a (that, for example, can be designed as an SQL server system) serves for this.

The I/O module with graphical user interface 41 (see FIG. 2) that runs on the monitoring system 7 can comprise a graphical representation of all device components of the document production system 1. Via selection of a device, it can receive diverse status information of this device, as well as information for all print jobs currently queued on this device. Via the mutual integration, all participating components on the server 7 or the databank structure 7a are to be read directly into another module or to be accepted therein, even when the data are primarily administered by another module.

Figure 15:
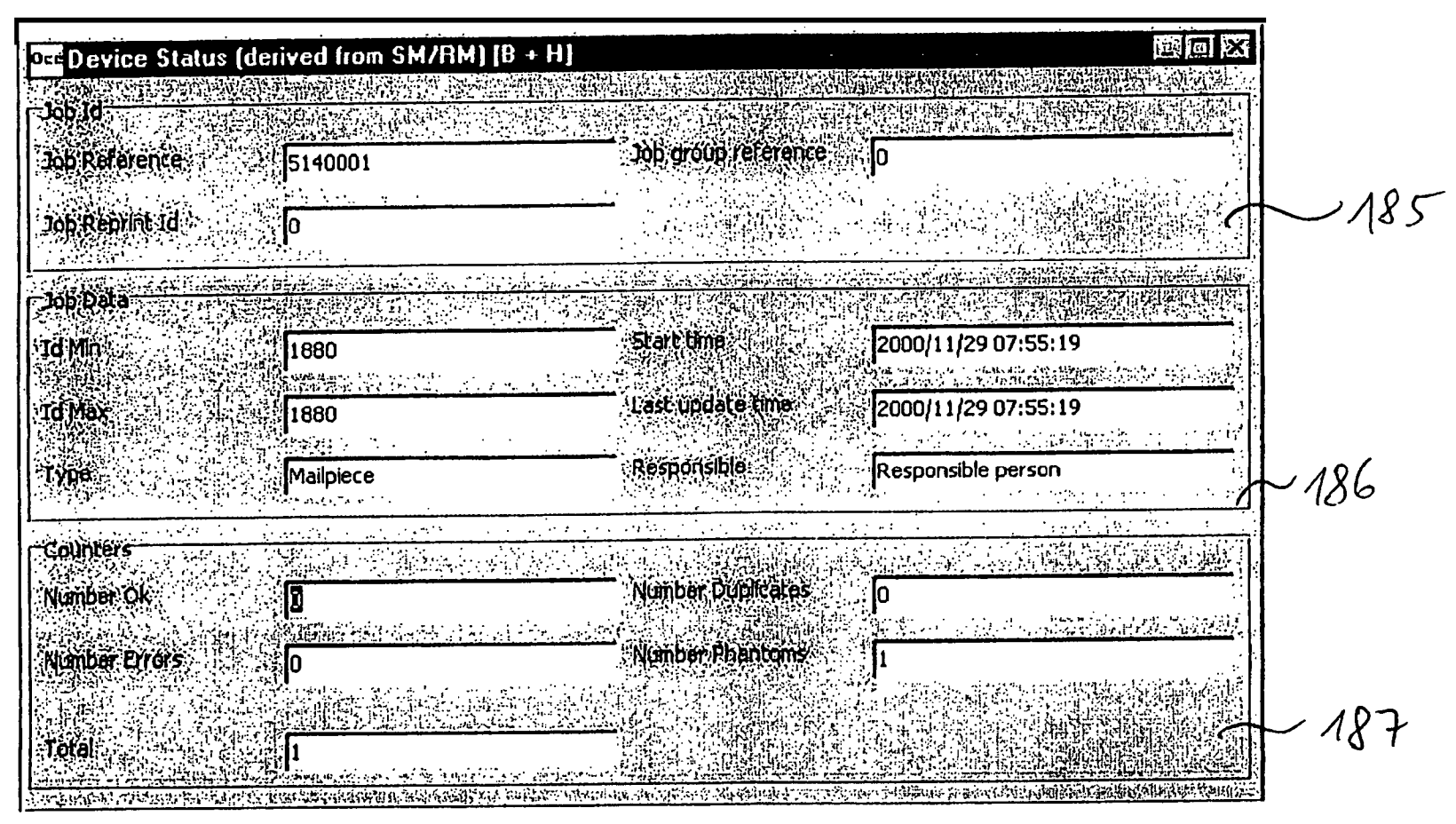

FIG. 15 shows an example in which data of the device manager 35 can be directly retrieved from the system manager 36. In a job ID field 165, identification data of the current job processing on this device are thereby shown. In the job data field 186, relevant data such as extent, type, start, time and responsible person are shown, and in the device data field 187 current static data about the selected device are shown.

Figure 16:
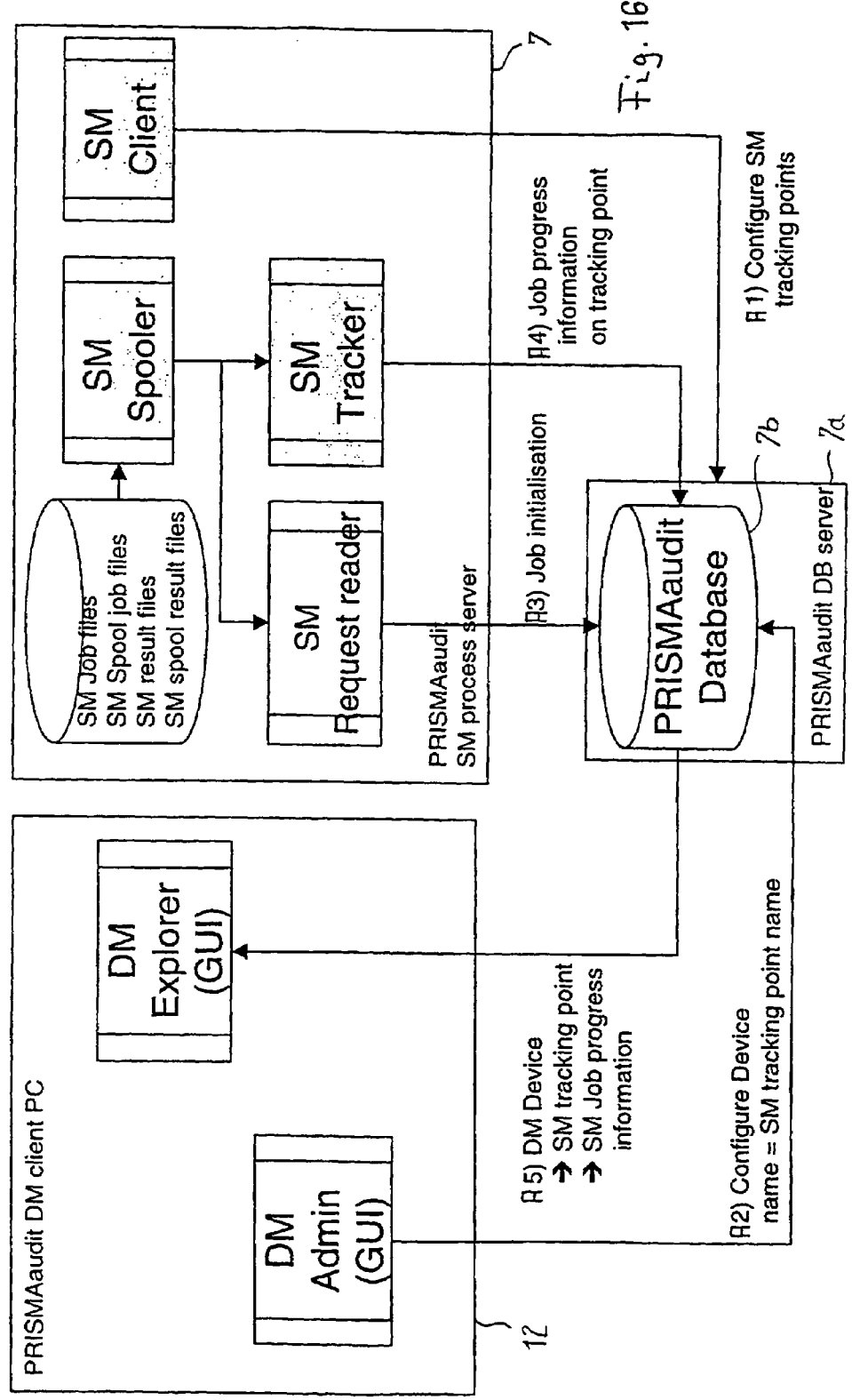
FIG. 16 illustrates an example for the cooperation of various components for information of the user.

FIG. 16 shows an example in which various components of the overall system designated with PRISMAaudit cooperate. In particular, for the individual components reference is made to FIGS. 1, 2 and 15.

In the shown example, modules of the device manager DM are arranged in the client computer 12 that respectively comprise graphical user interfaces GUI as they were typically specified in connection with FIG. 15. The assembly group monitoring computer 7 comprises various shown modules of the system manager SM. The connection between the client computer 12 and the monitoring computer 7 is established with the aid of the monitoring computer 7a via the databank 7b.

To configure the system shown in FIG. 16 and for functional flow, reference is made to the following work flows A1 through A5. According to the work flows A1 and A2, the device manager modules DM in the client computer 12, as well as the system manager modules SM, are computer-technically configured for the tracking points in the monitoring computer 7 with the same name. According to the work flows A3 and A4, the initialization for jobs occurs via the system manager modules SM. The tracking of the jobs at the various workstations also occurs via the SM modules. The data about the progress of the jobs are stored via the databank server 7a in the databank 7b. According to the work flow A5, the data determined by the system manager modules SM of the monitoring computer 7 are shown via the device manager modules DM in the client computer 12 at various tracking points on the graphical user interface (GUI). Furthermore, the user is informed about the progress of the respective job. In the shown example, a user can reproduce on the client computer 12 the data depicting the production process, and is thus completely informed about the current state of the complex production process.

Figure 17:
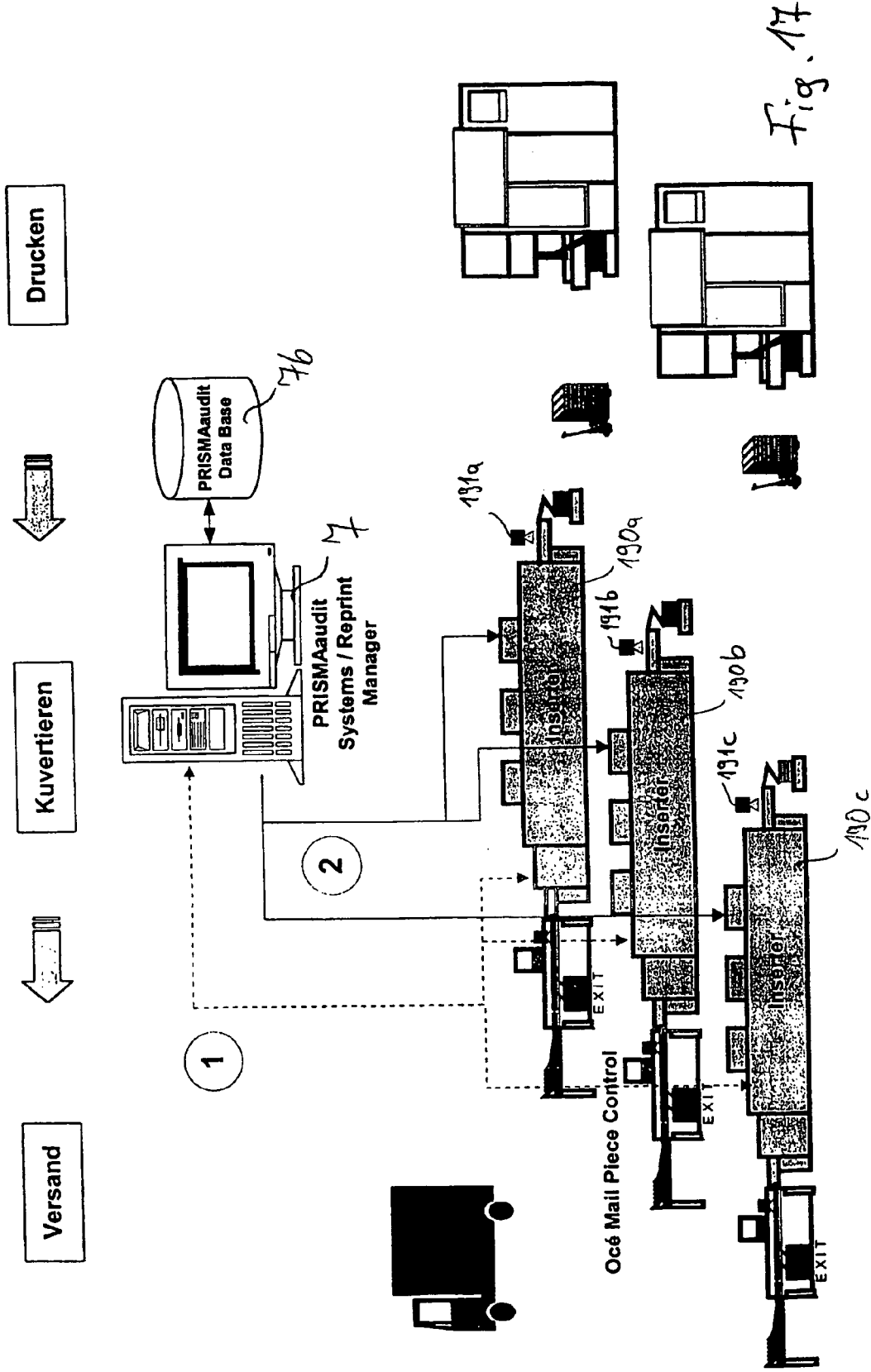
FIG. 17 illustrates a monitoring system for print post-processing devices.

The stop function, which is transmitted by the system manager or reprint manager to print post-processing devices such as inserters when a mailing or a document appears at the inserter that was already processed at the same or at another inserter, is again specified in FIG. 17. In FIG. 17, three inserter devices 190a, 190 b, and 190 c are equipped with respective barcode recording devices 191a, 191b, 191c. The barcode recording devices respectively record for processing queued mailings or documents and notify this result to the monitoring computer 7. In this, it is checked using the databank 7b whether the mailing or the document was already added to an inserter. Such cases can then occur when mailings have undergone a reproduction event (reprint) and the misprints were not properly remedied in preceding process stages. In these cases, the monitoring computer 7 transmits a stop signal to the corresponding inserter as well as a notification "stop via monitoring computer due to doubling". Via this notice, the user can recognize that the currently queued mailing was already processed, and she can furthermore withdraw this processing state, so that the mailing is not mailed twice. Such selected mailings can in turn be recorded with a hand barcode reader and be characterized as selected, such that such production steps are also recorded in the production monitoring system. A work flow on a cutting and inserting system can accordingly be specified as follows:

1. The operator inserts the printed paper into the cutting and inserting system.
2. The operator operates a reading device that is attached to the cutting device. Due to the printed job number, a corresponding release request is directed to the monitoring computer. When the corresponding job can be processed, the monitoring computer issues a release for a range of mailing numbers.
3. the cutting and inserting system is switched to an operating mode "automatic" and the system is started. The computer (client) built into the cutting and inserting system checks for each processed mailing number whether the printed job number coincides with the number range previously released by the monitoring computer. If it is determined that a printed mailing number lies outside of the released range, the cutting and inserting system is stopped and a corresponding error notice is output.
4. For each processed mailing, the processing result is entered into a result file. The entry occurs as soon as the mailing leaves the cutting and inserting system or an output tray has been reached.
5. The inserting results are transmitted to the reprint manager of the monitoring computer in the form of a result file. This result file is limited by the number of the identified markings (mailings) or is time-controlled. Also, given the identification of a new job a data termination is effected. Each check point provides its own result file.

To prevent double insertions, in particular given simultaneous processing of split jobs at various check points (cutting and inserting systems), the corresponding system can be stopped via a stop command (that is generated in the reprint manager) with corresponding error notification on the control panel.

Exemplary embodiments were specified. It is thereby clear that further developments and modifications by the average man skilled in the art can easily be specified. The system is in particular suitable to be realized as a computer program (software). It can thus be disseminated as a computer program module as a file on a data medium such as a diskette or CD-ROM, or as a file via a data or a communication network. Such comparable computer program products or computer program elements are possible embodiments. The process can be applied in a computer, in a print device, or in a print system with upstream or downstream data processing devices. It is thereby clear that corresponding computers on which the system is applied can comprise further known technical devices such as input means (keyboard, mouse, touchscreen), a microprocessor, a data or control bus, a display device (monitor, display), as well as a working storage, a fixed disk storage, and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for processing document data in a document processing system that comprises at least one document generation computer, a document processing computer, an electronic document output system, and a monitoring computer, comprising the steps of:
    generating document data on the document generation computer by use of a document generation module;
    transmitting the document data from the document generation computer to the document processing computer and processing the data there;
    forwarding the processed data to the document output system for output of the documents;
    to optimize control of the document output, in the processing computer providing the ability to both add or remove control data to or from transmitted document data by a processing module, and automatically forming and storing a control buffer file for the added control data and a document buffer file for the document data by a control service program running on the processing computer;
    monitoring the output system with the control data by the monitoring computer under real-time conditions, said control data comprising a barcode object; and
    for the monitoring of the document output, using the control data of the control buffer file to create a nominal list which is checked to determine whether parts of a job were output, and given errors of a checked job part, a reproduction job is automatically generated in the processing computer by using the nominal list and the document buffer file.

2. The method according to claim 1 wherein in a course of segmentation of the document data a resorting occurs according to predetermined sorting parameters.

3. The method according to claim 1 wherein by use of the processing computer the document data are analyzed job-by-job concerning their size with regard to a selectable parameter, and a job is divided into two partial jobs when it exceeds a predetermined size.

4. The method according to claim 1 wherein in the course of a formation of the reproduction job, new control data are allocated, and at least one of the control buffer file and the document buffer file are updated.

5. The method according to claim 1 wherein document outputs are recorded and tracked job-by-job according to selectable information groups, and wherein monitoring data are generated for tracking that are processed independently of the document data in the overall system.

6. The method according to claim 1 wherein:
    a plurality of program modules run in the monitoring system;
    a first of the program modules is provided to monitor the devices, and a second of the modules is provided to monitor print jobs; and
    via a predetermined function call, data of the first module appear within a display area of the other module.

7. The method according to claim 1 wherein the monitoring computer records which of at least one of mail pieces and documents were already processed in the document processing system, and a stop command is sent to the print post-processing device when at least one of the mail piece and a document is registered there that was already processed and registered at an earlier point in time in a corresponding post-processing device.

* * * * *